US011699085B2

United States Patent
Anderson et al.

(12)

(10) Patent No.: US 11,699,085 B2
(45) Date of Patent: Jul. 11, 2023

(54) METHODS AND ARRANGEMENTS TO IDENTIFY ACTIVATION PROFILE CONTEXT IN TRAINING DATA

(71) Applicant: Intel Corporation, Santa Clara, CA (US)

(72) Inventors: Glen J. Anderson, Beaverton, OR (US); Rajesh Poornachandran, Portland, OR (US); Ignacio J. Alvarez, Portland, OR (US); Giuseppe Raffa, Portland, OR (US); Jill Boyce, Portland, OR (US); Ankur Agrawal, Portland, OR (US); Kshitij Arun Doshi, Tempe, AZ (US)

(73) Assignee: Intel Corporation, Santa Clara, CA (US)

( * ) Notice: Subject to any disclaimer, the term of this patent is extended or adjusted under 35 U.S.C. 154(b) by 346 days.

(21) Appl. No.: 16/894,535

(22) Filed: Jun. 5, 2020

(65) Prior Publication Data

US 2020/0302301 A1    Sep. 24, 2020

(51) Int. Cl.
*G06N 5/04* (2023.01)
*G06N 3/04* (2023.01)
(Continued)

(52) U.S. Cl.
CPC ............... *G06N 5/045* (2013.01); *G06N 3/04* (2013.01); *G06N 3/08* (2013.01); *G06N 3/084* (2013.01)

(58) Field of Classification Search
CPC ............ G06N 5/045; G06N 3/04; G06N 3/08; G06N 3/084
See application file for complete search history.

(56) References Cited

U.S. PATENT DOCUMENTS

| 2012/0102050 A1* | 4/2012 | Button | G06N 5/043 |
| | | | 707/E17.014 |
| 2014/0095425 A1* | 4/2014 | Sipple | G06N 5/02 |
| | | | 706/52 |

(Continued)

FOREIGN PATENT DOCUMENTS

WO    WO-2020018154 A1 *    1/2020    ............. G02B 21/14

OTHER PUBLICATIONS

Google. The Building Blocks of Interpretability, https://distill.pub/2018/building-blocks/. Olah, et al., "The Building Blocks of Interpretability", Distill, 2018.

(Continued)

*Primary Examiner* — Stephen G Sherman
(74) *Attorney, Agent, or Firm* — KDW Firm PLLC

(57) ABSTRACT

Logic may determine a specific performance of a neural network based on an event and may present the specific performance to provide a user with an explanation of the inference by a machine learning model such as a neural network. Logic may determine a first activation profile associated with the event, the first activation profile based on activation of nodes in one or more layers of the neural network during inference to generate an output. Logic may correlate the first activation profile against a second activation profile associated with a first training sample of training data. Logic may determine that the first training sample is associated with the event based on the correlation. Logic may output an indicator to identify the first training sample as being associated with the event.

25 Claims, 11 Drawing Sheets

(51) Int. Cl.
*G06N 5/045* (2023.01)
*G06N 3/08* (2023.01)
*G06N 3/084* (2023.01)

(56) References Cited

U.S. PATENT DOCUMENTS

| | | | |
|---|---|---|---|
| 2016/0180078 A1* | 6/2016 | Chhabra | G06F 21/57 |
| | | | 726/19 |
| 2018/0268258 A1* | 9/2018 | Tapia | G06N 5/003 |
| 2018/0293464 A1* | 10/2018 | Martin | G06V 10/762 |
| 2020/0151516 A1 | 5/2020 | Anushiravani et al. | |

OTHER PUBLICATIONS

Zhongang Qi and Fuxin Li. Embedding deep networks into visual explanations. arXiv preprint arXiv: 1709.05360, 2017.
Park, D.H., Hendricks, L.A., Akata, Z., Schiele, B., Darrell, T., Rohrbach, M.: Multimodal explanations: Justifying decisions and pointing to the evidence. In: CVPR (2018).
Ghayoumi et al., "Local Sensitive Hashing (LSH) and Convolutional Neural Networks (CNNs) for Object Recognition" 2018 17th IEEE International Conference on Machine Learning and Applications, Dec. 17, 2018, pp. 1197-1199.
European Search Report and Written Opinion for the European Patent Application No. EP20208327, dated Jun. 11, 2021, 9 pages.

\* cited by examiner

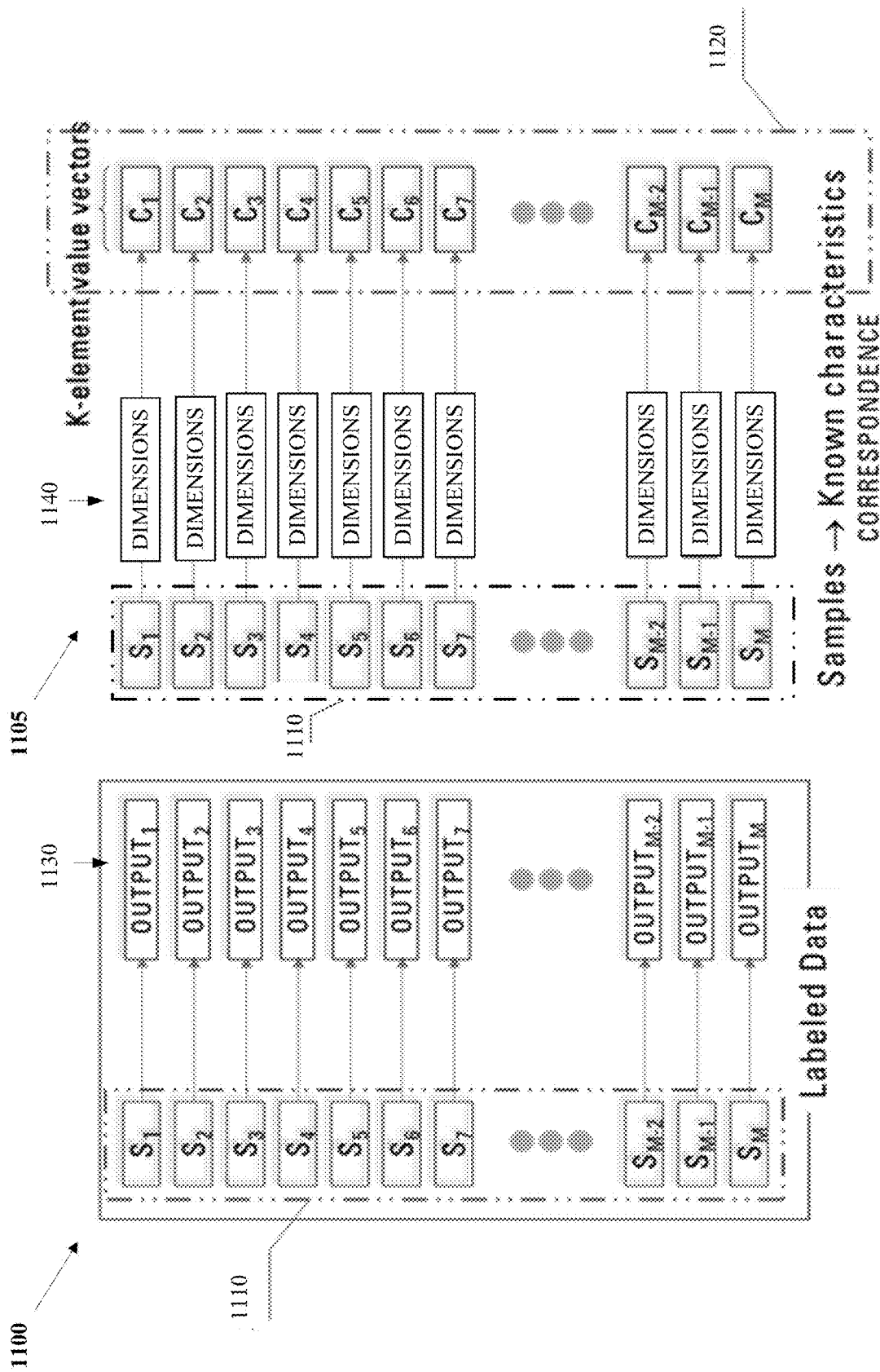
FIG. 1B2
FIG. 1B1

| | K1 | K2 | K3 | ...Kk |
|---|---|---|---|---|
| S1 | I11 | I12 | I13 | |
| S2 | I21 | I22 | I23 | |
| S3 | I31 | I32 | I33 | |
| ... | | | | Ikk |

FIG. 1D

| | K1 | K2 | K3 | ...Kk |
|---|---|---|---|---|
| S1 | I11, A11 | I12, A12 | I13, A13 | |
| S2 | I21, A21 | I22, A22 | I23, A23 | |
| S3 | I31, A31 | I32, A32 | I33, A33 | |
| ... | | | | Ikk, Akk |

FIG. 1E

METHODS AND ARRANGEMENTS TO IDENTIFY ACTIVATION PROFILE CONTEXT IN TRAINING DATA

TECHNICAL FIELD

Embodiments are in the field of in artificial intelligence. More particularly, embodiments may determine context for an inference by a machine learning model.

BACKGROUND

Artificial Intelligence (AI) is being used in more circumstances than ever, and regulators, customers, and end users are beginning to ask for transparency to show that AIs are working as believed: predictably, fairly, and safely. The main factor that determines how deep learning inference operates is the training data used in train and test the AI. However, looking at all the training data is usually not a realistic task, since it is often based, for example, on thousands of images for convolutional neural networks (CNNs) and thousands of hours of audio for recurrent neural networks (RNNs).

The contexts in which training data is collected has great relevance to the contexts that define activation profiles by a machine learning model during inference.

BRIEF DESCRIPTION OF THE DRAWINGS

FIG. 1B1-1B2 depicts an embodiment of labeled input data for a machine learning model along with an output and an auxiliary output of the model;

FIG. 1D-E depicts alternative embodiments of a scoring matrix such as the scoring matrices in FIGS. 1C, 1F, and 1G;

FIG. 1I depicts an embodiment of a system to train and validate a machine learning model with;

FIG. 2 depicts an embodiment of a flowchart to determine context for an inference of a neural network based on an event;

DETAILED DESCRIPTION OF EMBODIMENTS

Figure 1A:
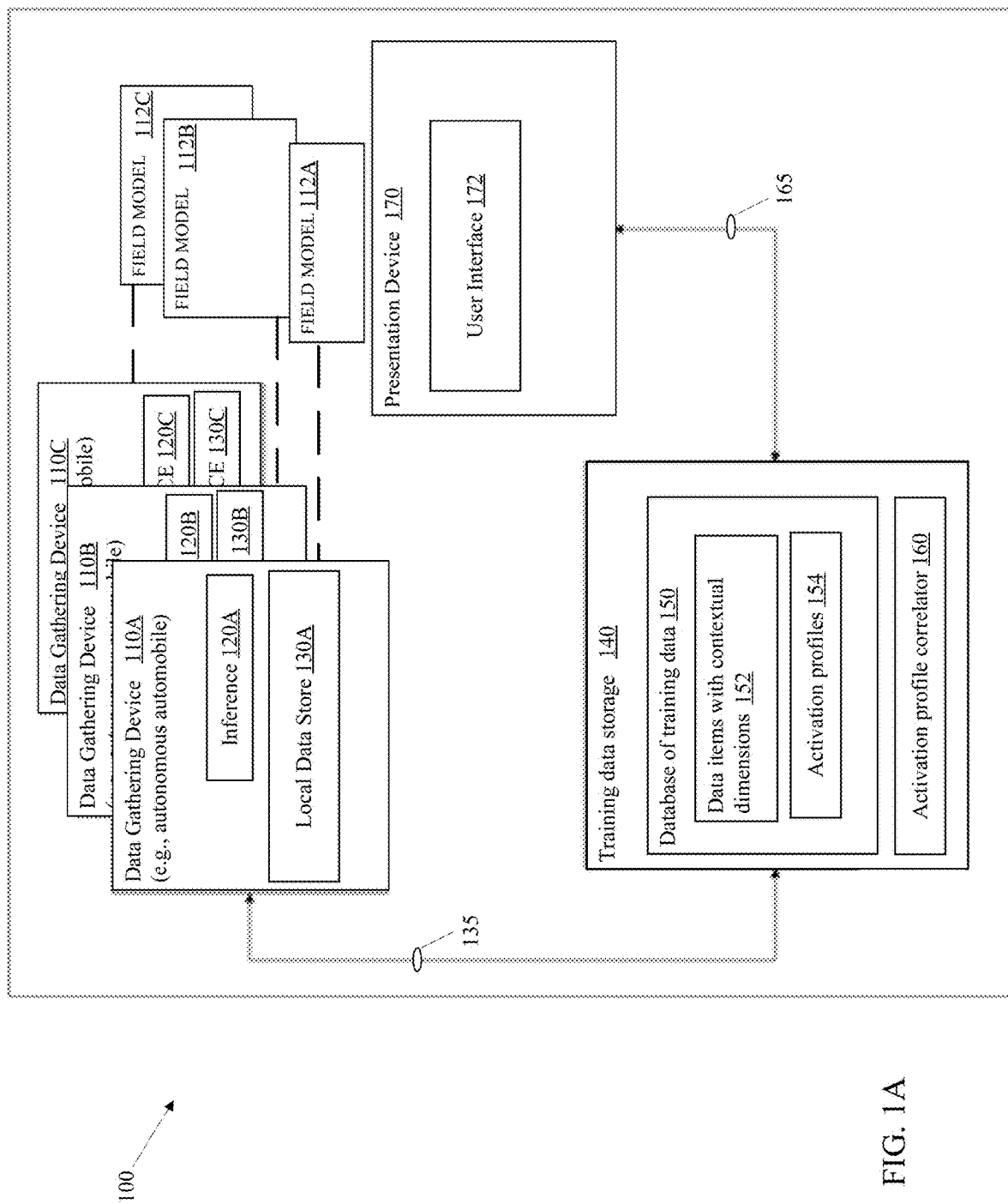
FIG. 1A depicts an embodiment of a system to present a specific performance of a machine learning model based on an event.

The following is a detailed description of embodiments depicted in the drawings. The detailed description covers all modifications, equivalents, and alternatives falling within the appended claims.

Embodiments implement ways to determine and present the context for a machine learning model's training data in ways that can be relevant to real-time viewing of the inference. Some embodiments may leverage tracked contextual dimensions to provide human interpretable explanations, e.g. why a recommendation from autonomous car differs from same input in different contexts. Such technologies may be referred to as Explainable Artificial Intelligence (XAI). While many examples herein discuss autonomous vehicles, embodiments described herein may be equally advantageous for machine learning models trained for other applications.

Embodiments may allow presentation of the context (such as video frames, audio clips, geographical location, time, road type, road surface, bridge, speed, intersection type, weather, or other contextual dimensions). The context may, for instance, allow a user to view how the inference of a machine learning model is processing input data based on a particular input. The user may easily trace an inference output back to the contextual dimensions or combinations of the contextual dimensions in which the training data was obtained or in which the inference of a machine learning model was tested to have a better understanding as to how the machine learning model generated the inference output.

Inference is a process by which a machine learning model, such as a trained neural network model, applies knowledge and a uses the knowledge to infer a result or inference output. The inference may determine, for example, a prediction as to the next event, a probability of an event, or a classification of an event based on the input data received about the event. The machine learning model may be a statistical or artificial intelligence model and may produce an inference output, for example, to make a decision for an autonomous vehicle to stop, go, turn right, turn left, go around an object, and/or the like.

Some embodiments may present the context for inference based on an event of interest by correlating activation profiles of data from the event against activation profiles that may be created during training or testing of the machine learning model with the training data. Such embodiments may identify training samples from the training data associated with the machine learning model in response to the event. For example, some embodiments may present a specific performance (inference) of a deep neural network (DNN) to a user by presenting context of the inference in the form of training samples that have similar activation profiles (for instance, a sufficiently matching hash) as that specific performance. A user may view or examine the specific performance of a deep neural network by viewing training samples correlated via contextual dimensions and/or activations of the DNN during the specific performance.

The event may be a situation for which the machine learning model makes a decision or generates an inference output. Some embodiments may automatically select events of interest based on default criteria or user selected criteria such as the inference output associated with a decision for an autonomous vehicle to stop, move, accelerate, brake, turn, or the like. Such events may be represented by a series of consecutive input data provided to the machine learning model. Other events may result from a single instance of input data provided to the machine learning model. In some embodiments, the user or a default process may identify an event of interest. One way to identify the event of interest is by identification of an actual inference output that differs from an expected inference output. Another way to identify the event of interest is by identification of an actual inference output that matches or matches within a margin of error, an expected inference output.

Contextual dimensions may also be referred to as tags, contextual data, contextual variables, contextual labels, contextual information, categorical data, categorical variables, categorical labels, categorical dimensions, and/or the like, and may be included as metadata with training data samples. In some embodiments, the contextual dimensions may be created by a user to describe a portion of or all the pertinent characteristics provided in the training sample. In further embodiments, a portion of or all the contextual dimensions may be inserted automatically from other sources such as sources of the training data (sensors, navigation system, radio data, and/or the like).

To illustrate, after an autonomous car crash (by a car at least in part guided by a deep learning inference), a user (regulator or developer) may want to understand better why the crash happened. The user may want to determine if the crash resulted from an incorrect decision from inference by a machine learning model. Some embodiments include a user interface to interact with the user to present context of the inference. Through input by the user into the user interface, the user may quickly view the contextual dimensions in which samples of the most relevant training or test data were obtained. Many embodiments may automatically predict a relevant subset of training samples from the training data. Further embodiments may allow the user to identify contextual dimensions of particular importance in identifying the training samples such as weather and road conditions. This, advantageously, allows the user to evaluate if the inference did not work well in the context of the crash and why. Additionally, a hierarchical contextual relationship based on contextual dimensions helps to build better explanations, eventually leading to reasoning capability on how system behaved for training versus inference.

Some embodiments may relate activation profiles (contextual dimensions, characteristics, and/or activations) of two or more different models. The two or more different models refer to independently trained models, models trained with at least one or more different sets of training samples, and/or models that receive different sets of input data such as models that receive data from one or more different and/or additional sensors, data based on similar context in different geographical locations, data based on the same geographical conditions, and/or the like. For instance, vehicles with different models may train and test with training samples and real-world testing in the same geographical areas or conditions. Co-relating the activation profiles of the different models may facilitate a better understanding or clarity by a user of the characterization of activation profiles on those vehicles.

Some embodiments offer security and privacy between models via, e.g., a trusted execution environment (TEE) to gather activation profiles of models (different models and/or the same model implemented as instances in different vehicles) to relate the training data, activation profiles, scoring, correlations, explanatory aspects, and/or other. The TEE may be an isolated processing environment that runs parallel to the operating system of a computer such as a server, workstation, tablet, or the like. The TEE may provide several security features, such as the isolated execution of code of a program/application, integrity and confidentiality. The data and applications stored in the TEE are protected cryptographically, and the interactions—either between applications or with the user—are securely performed. In other words, the TEE not only protects data but also communications with remote entities.

In some embodiments, the TEE enables trusted device identity and authentication as a layer of security and privacy. For instance, prior to transmitting data or communications to an entity, the TEE may confirm that the entity is a trusted device for a subset of or all communications and/or authenticate the identity of the entity. In such embodiments, different trusted entities may have access to different portions of data captured during training and validation and/or real-world implementations of participating models. In some embodiments, participation may involve crowd-sourcing data. Some embodiments implement a reward-based approach to attract crowd-sourced participants to sharing their training data, activation profiles, correlation, scoring, and/or explanation aspects.

To illustrate, a TEE may be implemented in one or more computers to provide a portion of or all the training and validation data for a training model such as a neural network. The TEE may include provide tiered access to training data, activation profiles, correlation, scoring, and/or portions thereof, by trusted entities. In some embodiments, the level of access by a trusted entity may be based on the type of trusted entity, the level of participation by the trusted entity, and/or the like. For instance, some trusted entities may only provide training data, activation profiles, and/or the like to the TEE. Some trusted entities may only access the TEE to obtain, e.g., anonymous training data, anonymous real-world activation profiles, and/or the like.

In some embodiments, the TEE may implement tamper proof policies to control or manage the level of granularity of activation profiles, correlation, scoring and/or explanation aspects stored or communicated from storage to and/or from other entities.

In further embodiments, the TEE may implement Intel Software Guard eXtensions (Intel SGX). Intel SGX may be a set of instructions that increase the security of application code and data, giving the application code and data more protection from disclosure or modification. Users may partition sensitive information into enclaves, which are areas of execution in memory with more security protection. Users are able to partition their application into, e.g., two parts—trusted and untrusted. The trusted part is what will be executed within the enclave (secure hardware). The enclave is decrypted on the CPU and only for code and data running within itself. In this way, the content of the enclave cannot be read (except in its encrypted form) by any external process, not even the operating system.

Some embodiments may improve artificial intelligence affinity for responding to context of situations in a manner similar to that of other models and/or for presentation of explanatory context to a user by sharing of training data, activation profiles, correlation, scoring, and/or explanation aspects via, e.g., a TEE and/or other mechanisms. In such embodiments, the training of one or more models may involve combining the inference outputs from other neural networks for the "same" context to provide an expected result for the model being trained and backpropagating errors (difference or residual between the expected result and the inference output from the model being trained) through the neural network of the model being trained. The "same" context refers to values of contextual dimensions that should or do impact the activation profile of the model being trained. Some embodiments may similarly combine the activation profiles, scoring, correlation, and/or explanation aspects of other models to train and/or validate models for inference and/or for scoring, correlation, and/or explanation aspects (by an activation profile correlator) to have an affinity towards producing the same output as the other models in the same or similar contexts.

In some embodiments, the training data may include associated contextual dimensions to categorize the training data. For instance, the training data may include sensor data such as video data, RGB sensor data, Lidar data, radar data, depth camera data, audio data, thermal sensor data, chemical detection data, humidity data, other sensor data, and/or the like. Some embodiments may automatically add contextual dimensions to training data and/or users may add contextual dimensions to the training data to categorize the sensor data. For example, a source of the training data may include a navigation system and the navigation system may include contextual dimensions such as the geographical location, the type of road, the type of intersections, the time of day, the speed of the vehicle, and/or the like. Other sources of contextual dimensions may include data transmitted with high definition radio signals, data from a vehicle's vehicle control system (VCS) such as an electronic control unit (ECU). ECUs may include an engine control module (ECM), a transmission control module (TCM), a steering control module (SCM), a brake control module (BCM), a global positioning system (GPS) module (GPSM), a vision control module (VCM), a heading control module (HCM), an in-vehicle infotainment unit (IVIU), etc.

In some embodiments, the contextual dimensions may include text such as "rainy conditions" to identify weather associated with the training sample. For neural networks associated with driving a vehicle, the contextual dimensions may identify dimensions such as road conditions, objects types encountered, intersection type encountered, weather conditions, road types, road material/surface types, type of audio encountered, tone of audio, amplitude of audio, thermal events encountered, temperature(s) encountered, speed, location, date and time, highway, bridge, intersection, railroad crossing, and/or the like.

Some embodiments may receive or generate the contextual dimensions as metadata associated with training data. One or more machine learning models may then generate a second or auxiliary output associated with an inference output. The auxiliary output may include characteristics, or attributes, associated with the contextual dimensions in the metadata received with the training data as well as an indication of the relevance of each characteristic in the training sample. In such embodiments, the activation profile comprises the indications of the relevance of the characteristics in the training sample of the training data.

Further embodiments include machine learning models that output activations in the form of activation vectors in addition to the characteristics, indications of the relevance of characteristics of the training samples, and the inference output. In such embodiments, the trained machine learning models may identify activations responsible for mapping the characteristics to the inference output and the activation vectors associated with the characteristics for each training sample.

Some embodiments may generate a data structure such as a scoring matrix to associate the indications of relevance with each of the characteristics of each of the training samples in the training data. Use of the scoring matrix may, advantageously facilitate various hashing operations on vectors in the scoring matrix to identify training samples related to input data of an event of interest. Further embodiments map the activation vectors with the training samples and characteristics in the scoring matrix. In such embodiments, the activation profile comprises the indications of the relevance of the characteristics as well as the activations responsible for mapping the characteristics in the training sample of the training data. For instance, in some embodiments, the machine learning models may output activations as activation vectors including one or more bits per activation and the machine learning models may output activations from one or more selected layers of the machine learning models or from all non-convolutional layers of the machine learning models. In some embodiments, the machine learning models may output one bit per activation to, advantageously increase the depth of the context provided to a user about an inference for an event of interest but also to reduce or minimize the amount of resources such as processing cycles and memory required to implement such machine learning models. In further embodiments, the machine learning models may output two bits per activation or four bits per activation to, advantageously increase the depth of the context provided to a user about an inference for an event of interest and balance the depth with the amount of resources such as processing cycles and memory required to implement such machine learning models.

Other embodiments may generate other data structures depending on the process implemented for processing associations between the training samples and the relevance of characteristics in the training samples.

Based on the characteristics associated with the training samples and the relevance output by a machine learning model of the characteristics for the inference, some embodiments identify groups or clusters of the training samples. Further embodiments identify groups or clusters of the training samples based on the activations in addition to the characteristics and the relevance of the characteristics. Some embodiments identify groups or clusters of the training samples based on the activations. For example, some embodiments may partition training samples into multiple subsets of training sample based on correlations such as clustering or locality sensitive hashing, of characteristics and indicators for the relevance of each of the characteristics for each training sample. Each indicator may represent an activation intensity associated with one or more characteristics. Further embodiments may partition training samples into multiple subsets of training sample based on correlations such as clustering or locality sensitive hashing, of activation vectors, characteristics, and indicators for the relevance of each of the characteristics for each training sample. For the degenerate case (small number of bits per activation), the use of both the activation vector and the characteristics may, advantageously avoid a situation in which too many activation vectors match the activation vector associated with the event of interest.

Some embodiments may identify the groups or clusters of the training samples, which may include partially or fully disjoint subsets of the training samples, based on vectors in the scoring matrix. An embodiment may determine how close (or far) the input image is to (from) each of the cluster's centroids and show only the contextual dimensions to which the input image is "closest". This is advantageous with respect to clustering based on the feature vectors or raw data. In that case the closest images can be surfaced, but the relationship is ambiguous or unknown. This approach on clustering along each contextual dimension can advantageously provide a better understanding of why a training sample is relevant, i.e., which contextual dimension(s) make the training sample relevant and the distance of a training sample from the centroid of each of the clusters may be an indicator as to the relevance of the characteristic for the training sample. Other embodiments may determine an indicator for relevance of a characteristic by other methods or measures.

To illustrate, a locality sensitive hashing (LSH) model such as a support vector machine (SVM), a model tree (MT), and/or the like, may hash vectors of the scoring matrix to cluster training samples about characteristics or combinations of the characteristics of the training samples. Some embodiments may generate subsets of the training samples and store the subsets in memory for use in selection of the training samples via contextual dimensions by a user.

Training samples from the training data can also be rated by the user as "relevant" or "not relevant". When an embodiment is used by enough users, the user ratings can be used as a filter to show images that are usually deemed as "good" explanations via a user interface. The user interface may be provided to convey the training samples to the user.

After identification of groups or clusters of the training samples, an event, e.g., in the field may occur that produces an inference that a user may want to investigate. The inference may output a successful classification or prediction or a failed classification or prediction. In some embodiments, the inference may output one part of or one vote towards a decision made by, e.g., an autonomous vehicle. For instance, the event may include a failure where the autonomous vehicle determined to stop at a railroad crossing when traffic conditions did not warrant the stop. The autonomous vehicle may include one or more machine learning models such as neural networks trained to identify various aspects of the situation approaching the decision to stop at the railroad crossing including, e.g., analysis of noise from one or more microphones, video from one or more cameras, and navigation markers identifying the railroad crossing from a navigation system. Each of the inferences from the one or more machine learning models may be combined by a statistical model or machine learning model to form the decision to stop the vehicle.

From a review of the inference outputs of the one or more models that combined to produce the decision to stop at the railroad tracks, the user may identify the inference output(s) that caused the autonomous vehicle to determine to stop and pursue a more in-depth review of the inference(s) from one or more of the models.

With a field sample of an unsuccessful inference (or a successful inference) such as for the inference for an event of interest, some embodiments may determine or trace back, the characteristics (or attributes) associated with the inference. Such embodiments may use the characteristics associated with the event to filter training data or match training data to characteristics associated with an inference of an event such as a vehicle crash. For example, some embodiments may identify training data by comparing the characteristics, or activation profile, associated with the inference of the event (e.g., vehicle crash) against the characteristics, or activation profile, associated with events in the training data. Some embodiments may correlate an activation profile output from a trained machine learning model based on an event of interest against activation profiles associated with training samples used to train and test the trained machine learning model. Some embodiments may prioritize one or more specific characteristics such as characteristics related to objects or weather, characteristics identified by a user via e.g. contextual dimensions, or the like.

The number of contextual dimensions may be large so many embodiments implement filtering logic circuitry to determine the number of contextual dimensions and to select the contextual dimensions to use to filter the training data. For example, data samples can be provided that match two contextual dimensions (tags) such as "weather" and "road conditions". However, some contextual dimensions can be more interesting (correlated to the input image) than others.

The activation vector for the field sample may be captured and stored in memory during the field testing or may be obtained by performing an inference with an instance of the field model that output the inference of the event of interest with the field sample. With the activation vector and/or characteristics for the inference of the event of interest, a activation profile correlator can trace the activation vector and/or characteristics back to a scoring matrix for the training model, or a subset of the scoring matrix for the training model, to correlate a subset of the training samples in the training data with the field sample for the event of interest.

The activation profile correlator may comprise any mathematical model to classify or predict a classification of the field sample based on the activation vector and/or characteristics (activation profile) associated with the event of interest. The activation profile correlator may associate the inference of the field sample with inferences of a subset of training samples to identify the subset of training samples with inferences most closely related to the inference of the field sample based on the activation profiles associated with the training samples and the field sample. For instance, the activation profile correlator may comprise a nearest neighbor algorithm, a machine learning model, a weighted combination of characteristic indicators and/or activation vectors, and/or the like. In many embodiments, the activation profile correlator may correlate the field sample with the scoring matrix of partitioned subsets of the training samples to identify the subset of samples with activation profiles most closely related to the activation profile of the field sample.

After identifying the subset of the training samples associated with the activation profile of the inference for the event of interest, a user interface can provide convenient access to the training samples, the field sample for the event of interest, and, in some embodiments, contextual dimensions for further filtering training samples. In further embodiments, the user interface may display sensor data for the event of interest as well as, e.g., visual and/or audio representations of activation profiles.

While some of the specific embodiments described below will reference the embodiments with specific configurations, those of skill in the art will realize that embodiments of the present disclosure may advantageously be implemented with other configurations with similar issues or problems.

Various embodiments may be designed to address different technical problems associated with explainability of a specific performance of a machine learning model. Other technical problems may include determining a correlation between training samples and inference associated with an event of interest; determining characteristics associated with an inference; determining activations associated with an inference; associating an inference with characteristics and/or activation vectors; associating an activation profile of an inference associated with the event of interest with a set of training samples that influenced the inference; presenting activation profiles to a user; and/or the like.

Different technical problems such as those discussed above may be addressed by one or more different embodiments. For instance, some embodiments that address problems associated with explainability of a specific performance of a machine learning model may do so by one or more different technical means, such as, receiving, by logic circuitry, a first activation profile associated with the event, the first activation profile to comprise an auxiliary output from the neural network based on activation of nodes in one or more layers of the neural network during inference to generate a primary output; correlating, by logic circuitry, the first activation profile against a second activation profile associated with a first training sample of training data; determining, by logic circuitry, that the first training sample is associated with the event based on correlation; and outputting, by logic circuitry, an indicator to identify the first training sample as being associated with the event. Some embodiments may also present the first training sample to a user along with the event of interest in the form of sensor data and visual and/or audible depictions of activation profiles associated with the event of interest and the first training sample. Such presentation may provide the user with insight as to how the inference by machine learning model output a successful or failed inference output.

Several embodiments comprise systems with one or more processor cores and may also comprise access points, and/or stations (STAs), sensors, meters, controls, instruments, monitors, Internet of Things (IoT) gear (watches, glasses, headphones, and the like), and the like for in-vehicle networks, vehicle-to-everything (V2X) networks, vehicle-to-vehicle (V2V) networks, vehicle-to-infrastructure (V2I) networks, vehicle-to-pedestrian (V2P) networks, vehicle-to-device (V2D) networks, and/or the like. In various embodiments, these devices relate to specific applications such as vehicle applications (automobiles, self-driving vehicles, other types of vehicles, and the like), and the like.

FIG. 1A depicts a block diagram of a system 100. The system 100 may comprise one or more data gathering devices 110A, 110B, and 110C; a training data storage 140, an activation profile correlator 160, and a presentation device 170. While the data gathering devices 110A, 110B, and 110C are illustrated as three devices in the system 100, any number of data gathering devices can be implemented. For instance, the data gathering devices 110A-C may represent three similar vehicles, three different vehicles, a fleet of vehicles, a line of vehicles, or any other implementation with trained machine learning models operating in inference mode.

As an example, each of the data gathering devices 110A-C may comprise inferences 120A-C and local data stores 130A-C, respectively. The inferences 120A-C comprise memory to store code or data for the field models 112A-C as well as logic circuitry to implement at least a portion of inference engines for the field models 112A-C. The field models 112A-C may comprise trained machine learning models such as convolutional neural networks (CNNs) for processing video samples captured in conjunction with one or more events of interest and/or recurrent neural networks (RNNs) for processing audio and/or voice command samples captured in conjunction with one or more events of interest. The inferences 120A-C may receive as input data, data from sensors such as RGB sensors, video capture devices, audio capture devices, temperature sensor(s), speed or speed related sensor(s), humidity sensor(s), voice command microphone, navigation system application program interface (API), and/or the like. The sensors may be part of or coupled with, e.g., an autonomous vehicle.

The training data storage 140 may include a database 150 and may store data related to training one or more machine learning models including the field models 112A-C. The training data storage 140 may comprise communication circuitry to communicate 135 with the data gathering devices 110A-C to obtain the inference outputs of the inferences 120A-C from the local data store(s) 130A-C such as activation profiles associated with the inferences 120A-C related to an event of interest. In some embodiments, the activation profiles may include characteristics associated with the inferences 120A-C for the event of interest and, in further embodiments, the activation profiles may include activation vectors associated with the inferences 120A-C for event of interest.

In the present embodiment, the training data storage 140 comprises a database of training data 150 and an activation profile correlator 160. The database of training data 150 may comprise data items with contextual dimensions 152 (also referred to as categorical data) and activation profiles 154. In other embodiments, the training data storage 140 may comprise data in data structures other than a database.

The data items with contextual dimensions 152 may include training samples with metadata such as labels that describe aspects of each training sample in the training data. For instance, if the training sample includes video for training a neural network, the contextual dimensions may include labels or identifiers such as "fog", "overcast", "rain", "dry", "wet", "humid", "hot", "cold", "speed", "intersection", "bridge", "railroad crossing", and/or the like.

After training one or more machine learning models, the activation profiles 154 may also include one or more scoring matrices or other data structures comprising a correlation between training samples, characteristics (or attributes) associated with each of the training samples, and indicators associated with each of the characteristics to indicate relevance with respect to inferences. The relevance of the characteristic may, for instance, be based on an intensity of the activations associated with one or more characteristics or a combination of characteristics. In further embodiments, the activation profiles 154 may also include one or more scoring matrices or other data structures comprising a correlation between training samples, characteristics (or attributes) associated with each of the training samples, indicators associated with each of the characteristics to indicate relevance with respect to inferences, and one or more activation vectors associated with the characteristics and the training samples. The activation vectors may include one or more bit representations of each activation on one or more selected layers or all non-convolutional layers of the one or more machine learning models. In some embodiments, the activation profiles are partitioned or clustered into subsets of the training samples from the training data. In such embodiments, identification of an activation profile similar to or correlated with an activation profile of a subset of the training samples may identify training samples associated with inference for an event of interest.

The activation profile correlator 160 may comprise logic circuitry to determine which training samples are of interest to present to the end user. In other embodiments, the activation profile correlator 160 may send data such as a scoring matrix, a subset of a scoring matrix related to a group or cluster of training samples, an activation profile, or the like to another system to perform one or more analyses to facilitate determination of which training samples are of interest to present to the end user. For instance, the activation profile correlator 160 may include a partition system and a tracing system. The partition system may partition (locally or via one or more other systems) training samples into multiple subsets of related training samples such as the partition system 1205 shown in FIG. 1C. The tracing system may determine (locally or via one or more other systems) a subset of training samples by tracing an activation profile associated with the inference 120A back to, e.g., a scoring matrix for the subset of training samples. In some embodiments, the tracing system of the activation profile correlator 160 may implement a system such as a statistical algorithm, LSH model, or neural network model to classify or predict that the activation profile associated with the inference 120A is more closely related with the subset of training samples than other subsets of training samples.

Thereafter, the activation profile correlator 160 may pass the subset of training samples and, in some embodiments, the scoring matrix for the subset of training samples to the presentation device 170 to present to the end user. The end user may further filter or adjust filtering of the subset of the training samples or identify a second subset of training samples based on selection of contextual dimensions associated with one of the other subsets of the training samples.

The activation profile correlator 160 is shown as co-located with training data storage 140 but may alternatively be located on a different server or computer, or be located on the presentation device 170, which would present one or more of the subsets of training samples to the end user via the user interface 172.

The user interface 172 may comprise code including instructions and data to execute on a computer such as a workstation, server, tablet, netbook, smart phone, and/or the like. In some embodiments, the user interface 172 generates a display and/or audio through execution of the code to present event analysis and one or more subsets of training samples to the end user locally and/or present to an end user remotely.

The user interface 172 may comprise two or more panels for display in a single window or in multiple windows. The two or more panels may include at least one panel to present the event analysis and at least one panel to present a subset of training samples predicted the activation profile correlator 160 and/or selected based on contextual dimensions selected by a user or in preferences for the user interface 172.

The presentation device 170 may comprise a server, workstation, laptop, netbook, tablet, smart phone, and/or the like. The presentation device 170 may comprise communication circuitry to communicate 165 with the training data storage 140. In some embodiments, the presentation device 170 may comprise the activation profile correlator 160 to receive at least a portion of a subset of training samples associated with an inference for an event of interest from the training data storage 140.

The inference 120A on the data gathering device 110A may be located at a different location such as the training data storage 140 and/or the presentation device 170, or, for example in another server such as a cloud-based server. The training data storage 140 may be cloud-based or edge-based, depending on the needs of a given implementation.

Figure 1C:
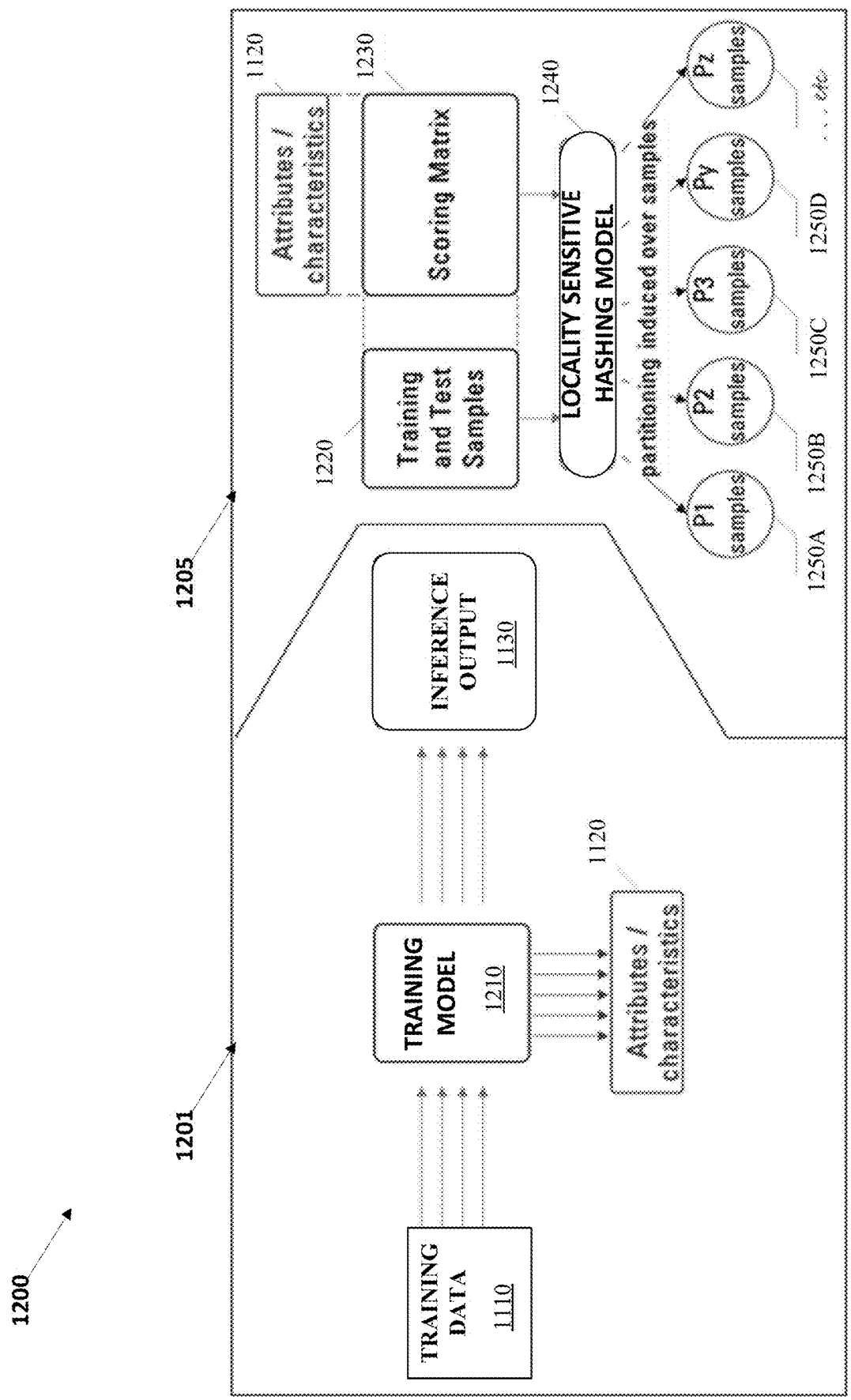
FIG. 1C depicts an embodiment of inference by a machine learning model, generation of a scoring matrix, and partitioning of training and test samples into subsets.
Figure 1F:
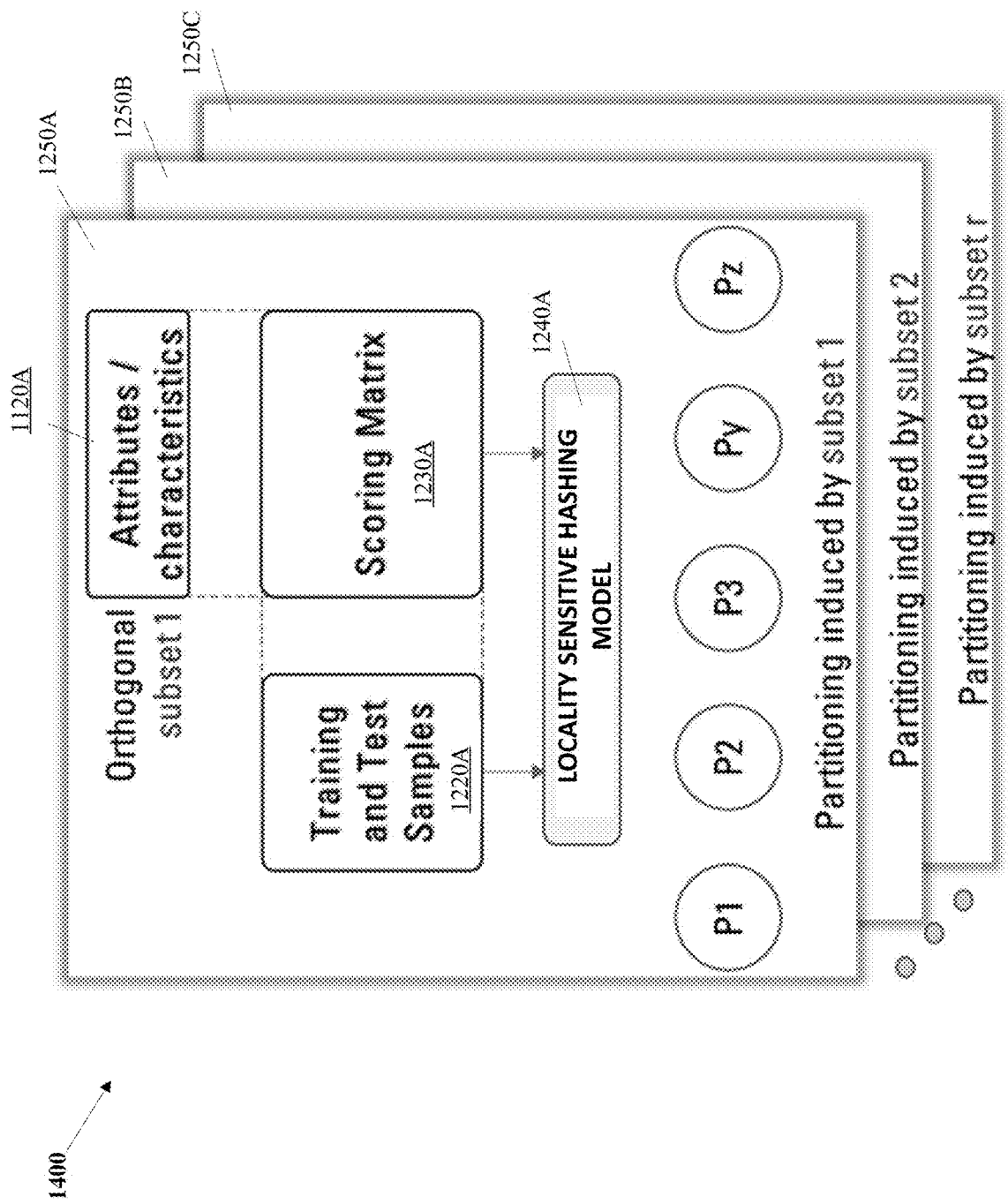
FIG. 1F depicts an embodiment of partitioning of training and test samples into subsets.
Figure 1G:
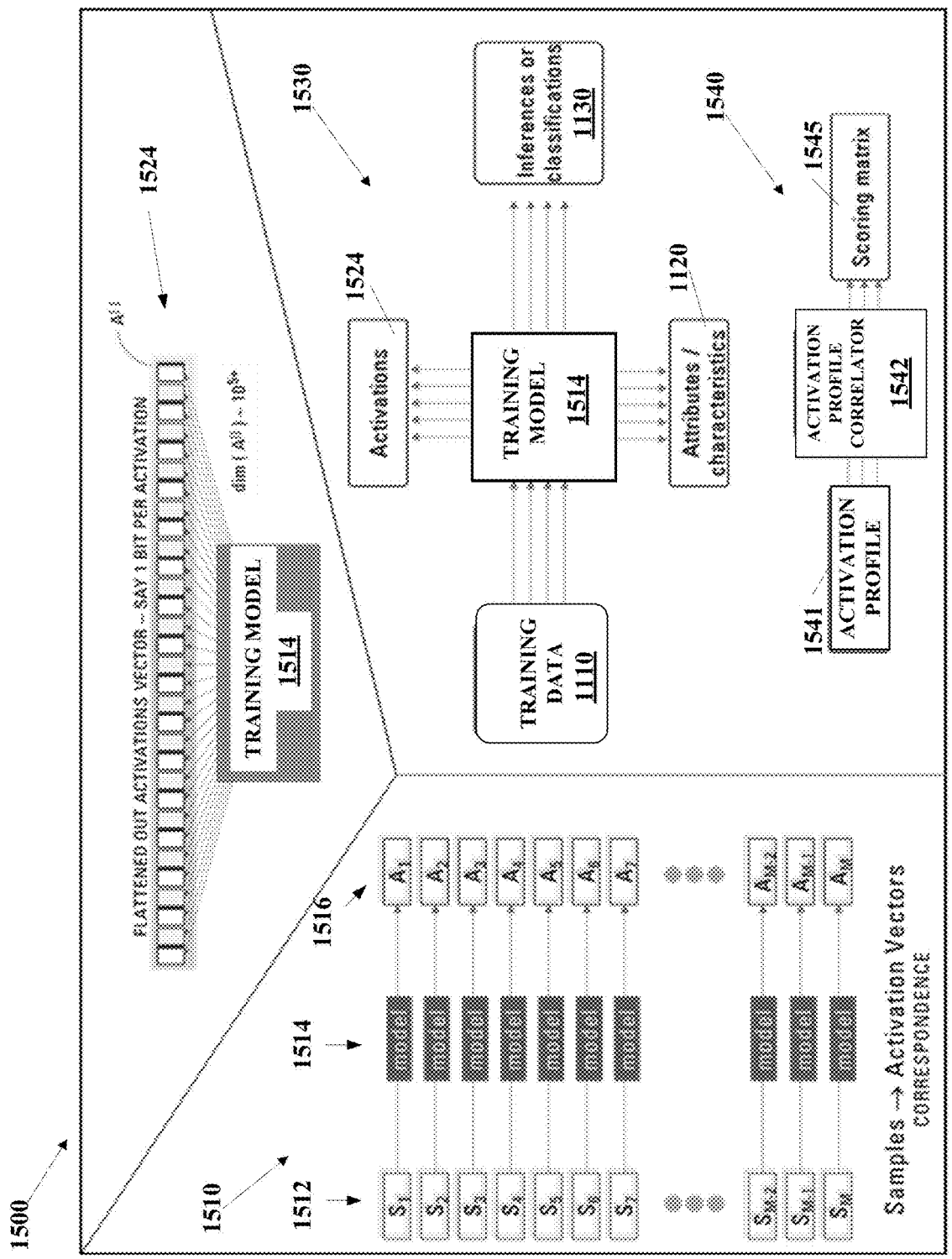
FIG. 1G depicts an embodiment of labeled input data for a machine learning model along with an output and auxiliary outputs of activation vectors and characteristics of the model and depicts an embodiment of an activation profile correlator to identify a scoring matrix based on an activation vector of a field sample associated with an event.
Figure 1H:
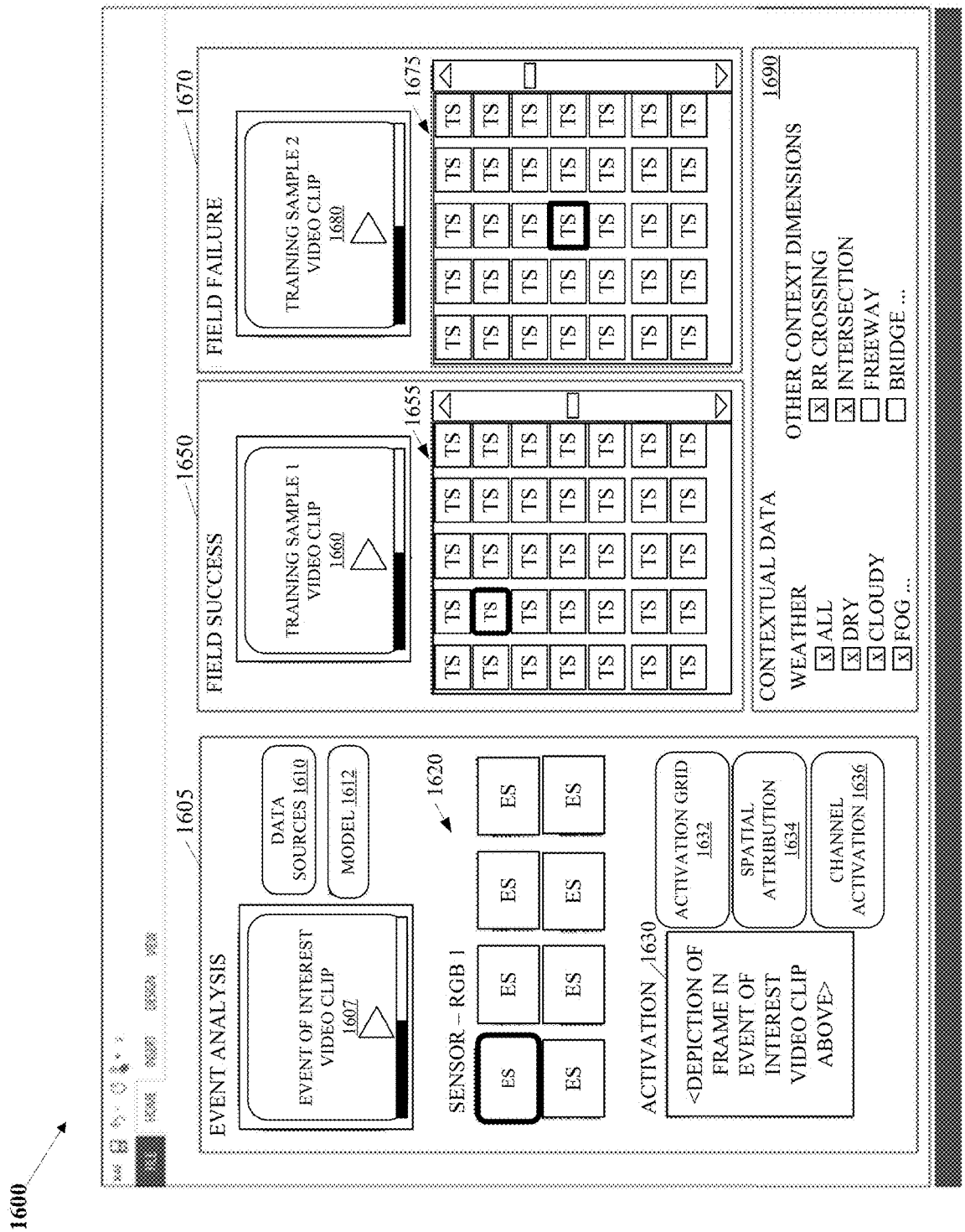
FIG. 1H depicts an embodiment of a user interface to present a specific performance of a machine learning model to a user.
Figure 1I:
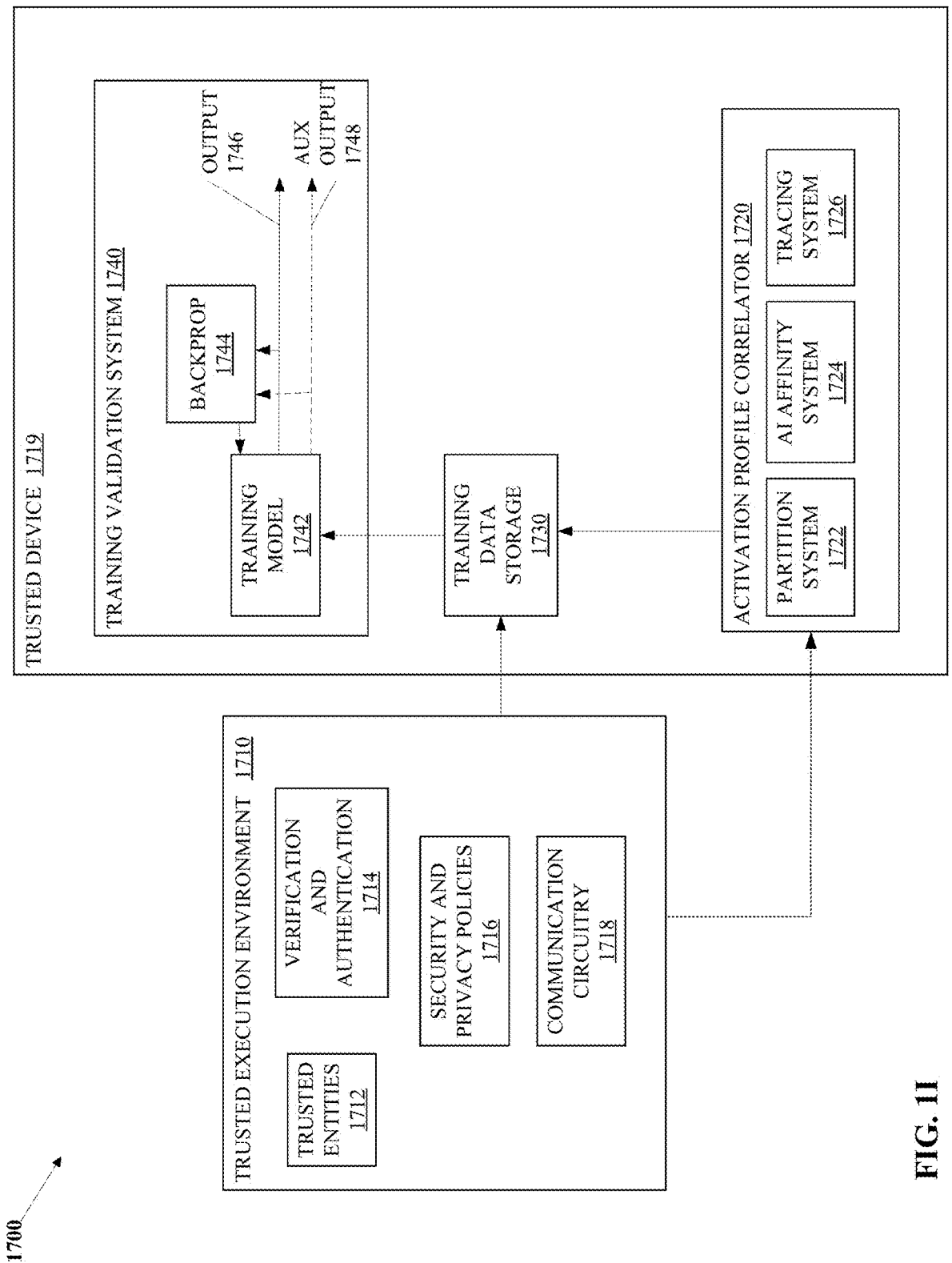
Figure 2:
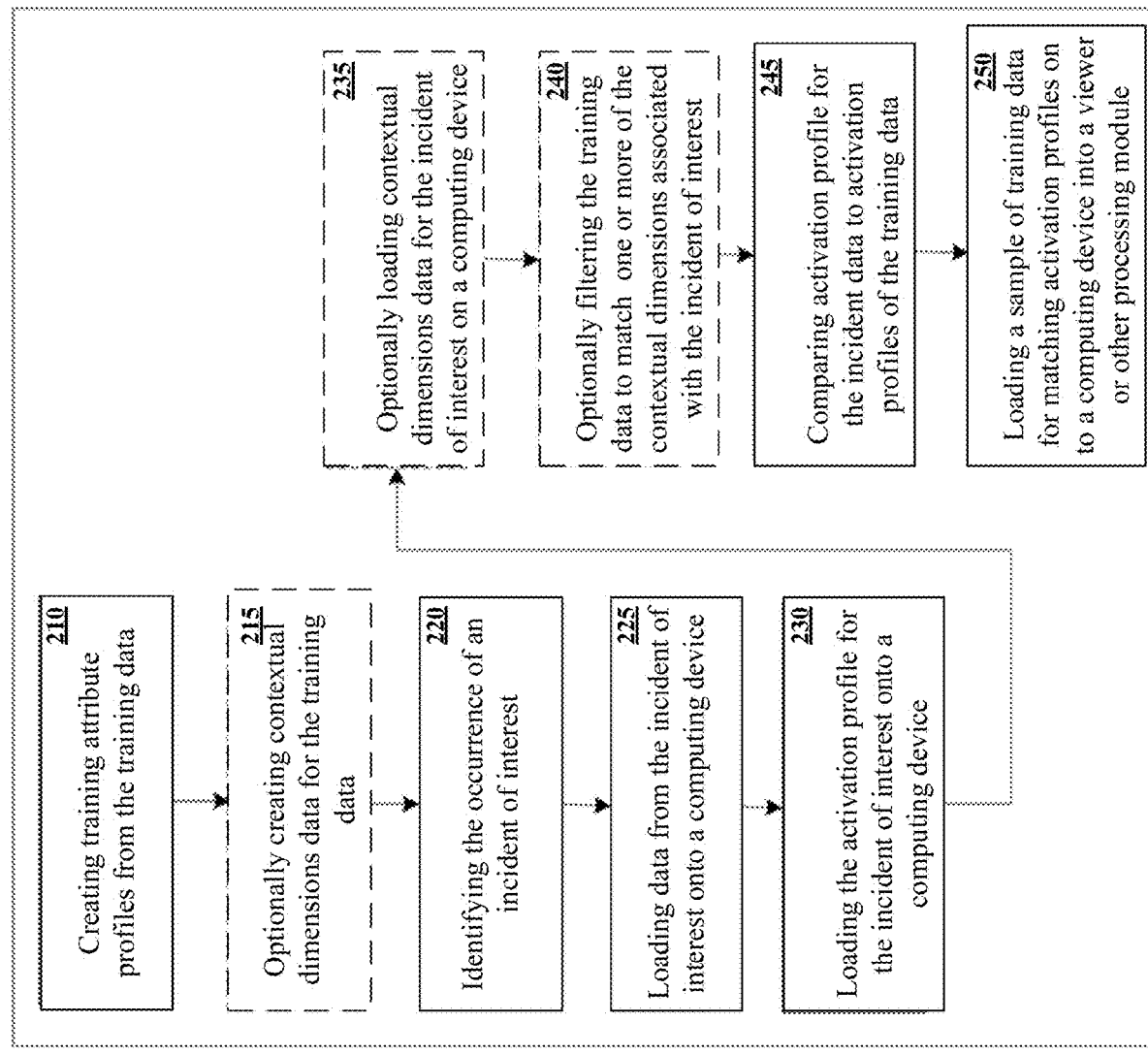

FIGS. 1B1 and 1B2 depict a block diagrams 1100 and 1105 of relationships between the training data 1110, output 1130, and auxiliary outputs 1120 during training of a machine learning model. The training data 1110 may include labeled input training samples, S1 through Sm, which correspond to outputs 1130, Output1 through Outputm, respectively. The labeled input training samples, S1 through Sm, may be labeled with expected outputs to provide supervised training to a machine learning model such as a DNN. The DNN may receive the labeled input training samples, S1-Sm, generate an output, and, during training, correlate the outputs with the expected outputs to, e.g., generate a residual or error. The residual or error may be backpropagated through the DNN to adjust the weights of nodes to correct for the error. After thousands or tens of thousands of training samples, the DNN may become a trained DNN and operate in inference mode for testing with testing samples. In many embodiments, the training and testing samples are selected from training data.

Many embodiments include contextual dimensions with the training and testing samples in the form of, e.g., metadata. The metadata may include labels such as "rainy weather", "foggy weather", "wet road", "dry road", "railroad crossing", "bridge", "time", "date", "geographical location", "global positioning system coordinates", and/or the like, and be associated with corresponding portions of input data in each of the training samples. The DNN may track the track or quantize activations in nodes of the DNN on one or more of the layers of the DNN to provide one or more auxiliary outputs along with an output, Output1 through Outputm. For example, the DNN may output a classification or prediction related to an action that an autonomous vehicle should make in response to an event and, along with the output, provide an auxiliary output 1120, which includes Known element value vectors C1 through Cm, respectively shown in FIG. 1B2.

The labeled input training samples, S1 through Sm, may correspond to outputs 1130, Output1 through Outputm, respectively, and auxiliary outputs 1120, which includes Known element value vectors C1 through Cm, respectively. The labeled training samples S1 through Sm establish a relationship between each training sample S1 through Sm, the dimensions 1140 (also called contextual dimensions), and the outputs 1130, Output1 through Outputm.

The Known element value vectors C1 through Cm may each include vectors of characteristics (or attributes) of the corresponding training samples, S1 through Sm, respectively, that are generated by a training model. The training model, such as a deep neural network (DNN), may include, e.g., a pooling layer or the like, to associate the dimensions 1140 with characteristics in the training data 1110 and may generate indicators for each characteristic in each of the Known element value vectors C1 through Cm. The characteristics along with the indicators is referred to as an activation profile, in some embodiments. The indicators may indicate the relevance of each of the characteristics on inference by the DNN for each of the training samples. For instance, the relevance of the characteristic may be based at least in part on an intensity or concentration of activations associated with the characteristic within one or more layers of the DNN and/or within one or more areas of each of one or more layers of the DNN. In some embodiments, a scoring matrix or other data structure stores the relationship between the training samples, the characteristics, indicators, and inference output (classifications, probabilities, predictions, or the like) generated by the training model such as the scoring matrix 1230 shown in FIG. 1C. In some embodiments, the scoring matrix is generated from inference outputs by the training model during validation, or testing, with the training samples designated for validation. In other embodiments, the scoring matrix is generated from inference outputs by the training model during training and validation with the training samples of the training data designated for both training and validation.

FIG. 1C depicts an embodiment of a block diagram of a system 1200. The system 1200 includes a training and testing system 1201 as well as a partitioning system 1205. The training and testing system 1201 may train and validate a training model 1210. The partitioning system 1205 may generate or create a scoring matrix 1230 based on the inference outputs 1130 from the training model 1210 and group or cluster the training samples of the training data 1110 into subsets of training samples 1250A, 1250B, 1250C, 1250D, etc.

In the training and testing system 1201 on the left of FIG. 1C, the training model 1210 is trained to output predictions, classification, probabilities, or the like, which are referred to as inference outputs and to output the auxiliary outputs, characteristics 1120, also referred to as attributes or known characteristics. While the numbers of activations may be very large—e.g., in millions, the number (K) of characteristics 1120 may typically be much smaller in number, numbering into 10s or about 100 or so. In some embodiments, the number (K) of characteristics 1120 may be one or more orders of magnitude smaller than the number of activations in layers of the training model 1210.

The partitioning system 1205 is on the right in FIG. 1C and may store outputs for both training and validation samples of the training data 1110 in the data structure of a scoring matrix 1230 as illustrated in FIGS. 1C and 1D. The scoring matrix 1230 may include one row per sample 1310 and K columns 1320, K1 through Kk. The K columns 1320, K1 through Kk include one column for each characteristic of the characteristic vectors, C1-Cm, evaluated by the training model 1210. The characteristics are associated with the dimensions 1140 provided as, e.g., metadata, with the training data 1110 at the input of the training model 1210 as shown in FIGS. 1B1 and 1B2. The scoring matrix 1230 may also include a score 1330 (referred to as an indication or indicator, I11 through I33) for each training and testing sample 1220 in each characteristic columns, K1 through Kk. Each row in this scoring matrix 1230, i.e., each training sample, thus is a point in a K-dimensional space. The indicators may represent a weighted combination of one or more factors such as an activation intensity in one or more areas of a layer and/or within one or more user-selected or default layers of the training model 1210.

Using techniques like Model Trees (MT) or Support Vector Machines (SVM), or, more generally, Locality Sensitive Hashing (LSH), the locality sensitive hashing model 1240 may separate the training and test samples 1220 in the scoring matrix 1230 into many subsets or partitions (1250A, 1250B, 1250C, 1250D, etc.). Each subset may contain a relatively small number of the training and testing samples 1220 (usually, a logarithm of the total number of samples, under LSH).

Use of MTs may, advantageously yield human interpretable criteria for the partitions, and are also, advantageously hierarchical. Further embodiments may use more sophisticated techniques like Gaussian mixture models or neural networks to induce these partitions among the training and test samples 1220. (Note that it is not necessary for these partitions to be covered by convex polyhedra).

FIG. 1E shows an alternative scoring matrix 1350 for the scoring matrix 1230. In the scoring matrix 1350, the rows include the training and test samples 1310 (one per row), the columns include the characteristics (K1-Kk) 1320 as discussed in conjunction with FIG. 1D, and the intersections of the rows and columns include the indicators (I11 through I33) to score the relevance of each characteristic (K1-Kk) in determining the inference output for each training and test sample 1310. The K-dimensional space 1340 in the scoring matrix 1350 also includes activation vectors (A11 through Akk). The activation vectors may include activations from one or more layers of a training model such as the training model 1210, as is explained further in conjunction with FIG. 1G.

FIG. 1F shows a refined version of the partitioning system 1205 on the right in FIG. 1C. In FIG. 1F, the space 1400 of characteristics may itself not be dense (independent of samples falling into it). For example, many combinations of characteristics 1120 (K1-Kk) may be non-existent. For example, it would be rare for an image to contain both a giraffe (first characteristic) and office furniture (second characteristic); or driving conditions be slippery (first characteristic) at the same time that temperature is high (second characteristic) under normal driving conditions. Thus, different sets of partitions (subsets of training data) 1250A, 1250B, 1250C, etc. may be derived for different subspaces over the space of characteristics 1120 (K1-Kk).

Accordingly, when an unexpected inference output results from an inference by the training model 1210, the model-provided characteristics 1120A that accompany the inference output may identify the subset of training data 1250A containing, e.g., near neighbors (P1, P2, P3, Py, Pz) of the input training and test samples 1220A. At the same time, the characteristics 1120A for the subset of training data 1250A may be presented on a scale, to the user or analyst, for assessment via a console or user interface such as the contextual data panel 1690 shown in the user interface 1600 of FIG. 1H. In such embodiments, the user can see representative samples from both the actual partition, subset of training data 1250A, that the training and test samples 1220A should be in based on its actual characteristics 1120A (the training or test sample with the closest activation profile to the activation profile of the unexpected inference), alongside representative samples from the subset of training data 1250A that the training model 1210 (in FIG. 1C) predicts (the training and test samples with activation profiles near the closest activation profile).

While the concept in FIG. 1G is similar to the training and partitioning shown in FIG. 1C, FIG. 1G advantageously depicts a deeper resolution method 1500. This method 1500 operates over the activations along with various higher-level characteristics, to drill deeper into which activations of nodes in the training model 1514 may be pivotal in a misleading inference output 1130 and correlated with characteristics 1120.

In FIG. 1G, a number of key layers in the training model 1514 have been identified or selected (or, by default, all non-convolutional layers are identified), and the activations (activation vector 1524) of the key layers are represented in a bit vector, A1-Am (such as 0-1 quantization), or perhaps using a vector with 2-bit elements (quantization into 4 ranges)—or 4-bit elements, shown at the top of FIG. 1G. Each training sample in the training data 1110 may generate a bit vector 1524 as shown in bottom left portion 1510 of FIG. 1G, once the training model 1514 has been trained. Thus, a scoring matrix 1545 may be created, in which both the activation element values, activation vectors A1-Am 1516, and the vertical characteristics (K) 1120, as shown in FIG. 1E, are associated with each training sample 1512, S1-Sm, in the training data 1110. The training samples 1512 may become the basis for an LSH model-based partitioning such as the LSH model 1240 and 1240A depicted in FIGS. 1C and 1F.

Accordingly, when input data (such as a field sample) is misclassified by the training model 1514, both the activation vectors 1524 and the characteristics 1120 identified by the training model 1514, can be used to identify the partitions or subsets 1250A through 1250C in the training and test samples of training data 1110 that are closest to the input data for an event of interest. An activation profile correlator may identify representative training samples. Thereafter, a console a user interface such as user interface 1600 in FIG. 1H may present for assessment, explainable inference of the training model 1514. The user interface may present the explainable inference by explicit (recognizable) characteristics via the contextual dimensions provided to the training model 1514 and by the inner workings of the training model 1514 present in the activation vectors 1524. In this way, activation vectors 1524 that are pivotal may be identified. In the degenerate case, there may be too many activations identified—due to high dimensionality in the activation space; but some embodiments can advantageously solve this by subdividing the characteristics 1120 space and inducing disjoint subsets of the training and test samples (training data 1110) in the activation vector 1524 space into separate hierarchies.

FIG. 1G also illustrates a system 1540 to trace an inference of input data for an event of interest to training samples in a scoring matrix 1545 such as the scoring matrix 1350 shown in FIG. 1E. The system 1540 provides as input data, the activation profile 1541 of the inference for the event of interest, to a second model referred to as an activation profile correlator 1542. The activation profile 1541 may include the activation vectors 1516 as a one or more bit per activation vector from one or more layers of the training model 1514 and may also include characteristics 1120 output from the training model 1514.

The activation profile correlator 1542 may identify the scoring matrix for a subset of the training and test samples such as the scoring matrix 1230A for a subset 1250A of the training and test samples 1220A based on the activation profiles associated with the subset 1250A. Upon identifying the subset 1250A that correlates most closely with the activation vector 1516, the subset of the training and testing samples 1220A can be communicated to and presented by a user interface to a user. Furthermore, an LSH model may, advantageously, also determine the closest activation profile (s) associated within the subset 1250A of the training and test samples 1220A by correlating the activation profiles (the row of characteristics indicators and activation vectors associated with each of the training and test samples 1220A) or by determining a specific hash of the scoring matrix 1230A.

FIG. 1H depicts an embodiment of a user interface 1600 such as the user interface 172 shown in FIG. 1A. The main idea is that a user may view how a trained model is working on the inference of a particular input data and easily trace back the inference to the types of context in which the training data was obtained or in which the trained model was tested. The user interface 1600 may accomplish this by facilitating a comparison of activation profiles from the event of interest in an event analysis panel 1605 and activation profiles in the field success panel 1650 and/or the field failure panel 1670 that may be created during training and testing for the training data such as the training data 1110 shown in FIGS. 1A, 1C, and 1G.

The user interface 1600 includes the event analysis panel 1605 to view an event of interest. Matching training is presented in the Field Success panel 1650 and Field Failure panel 1670. The Field Success panel 1650 and Field Failure panel 1670 may include the training samples that are ultimately retrieved based on activation profile matching of the inference for the event of interest and the training data. Two example categories of contextual dimensions are also shown in the contextual data panel 1690, "Weather" and "Other Context Dimensions". There could be many such dimensions, multiple categories, and the contextual dimensions may be arranged in any way that is convenient for a user such as via a pull-down menu. Furthermore, the arrangement of the panels 1605, 1650, 1670, and 1690 may be user configurable via one or more preference selections.

The user interface 1600 may indicates that multiple data types may be of interest for the user of such a system. In the present embodiment, the user may select RGB sensor data for comparison but may also select Lidar, radar, depth camera, and other sensor data. Further embodiments may include audio data, chemical data or any data that can be used in, e.g., DNNs.

For example, after an autonomous car drives through a stop sign (a car at least in part guided by a deep learning inference), a user (regulator or developer) may want to understand better why the autonomous car did not stop at the stop sign. Through input on a user interface 1600, the user could quickly view the context in which samples of the most relevant training or test data were obtained. The most relevant training data shown in the field success panel 1650 may illustrate that the autonomous car stopped at each of the stop signs. The field failure panel 1670 may show field failures when the stop sign was obstructed prior to reaching the corresponding intersection. The event analysis panel 1605 may show that the stop sign for the event of interest was not obstructed but was defaced by a sticker. Upon review of the RGB sensor data 1620 in the event analysis panel 1605 and the activation grid (button 1632) in the activation window 1630 through multiple video frames leading up to the intersection, the various sensors may show activations about the stop sign but no substantial activations indicative of the recognition of a need for the autonomous vehicle to react to the stop sign.

The user may draw a few conclusions about the inference based on review of the training samples in the field success panel 1650, the field success panel 1670, and the event analysis panel 1605. The trained model successfully recognizes unobstructed stop signs and correctly stops the vehicle. The trained model fails to stop at obstructed stop signs. Furthermore, the user interface 1600 did not present a stop sign defaced by a sticker or other in the training data. Thus, the training for the trained model should be supplemented to include training for partially obstructed stop signs as well as training with stop signs defaced with various stickers, paint, scratches, and other.

The user interface in FIG. 1H may facilitate comparison of data samples that match the activation profile of the event of interest (e.g., the recent car accident video data). For instance, the panel 1650 may include a first subpanel 1655 of a subset of training and test samples (TSs) related to successful field inferences during training and validation such as the subset 1250A in FIG. 1F due to a correlation with an activation profile of the inference for the event of interest shown in the event analysis panel 1605. The field failure panel 1670 may include a second subpanel 1675 of a subset of training and test samples (TSs) related to failed field inferences during training and validation such as the subset 1250A due to a correlation of an activation profile of the inference for the event of interest shown in the panel 1605.

The panels 1650 and 1670 may include subpanels 1660 and 1680, respectively, to show video clips of the training data selected by a user by highlighting a training sample in the first subpanel 1655 and the second subpanel 1675, respectively.

Note that user interface 1600 is one of many possible user interfaces. Embodiments are not limited to a particular arrangement in the user interface 1600. Other embodiments may include other arrangements of the event analysis panels and training samples.

The first subpanel 1655 and second subpanel 1675 may include samples from training data and also in real-world testing that correlated with activation characteristics during the event of interest. The first subpanel 1655 and second subpanel 1675 of a subset of training and test samples (TSs) are, advantageously, highly relevant to the particulars of the incident being viewed by the user in the event analysis panel 1605.

In other embodiments, the first subpanel 1655 and second subpanel 1675 may include different subsets of TSs identified by the activation profile correlator such as the activation profile correlator 1542. For instance, the first subpanel 1655 may include a subset of the TSs predicted by the activation profile correlator based on all characteristics 1120 or default selections of the characteristics 1120. The second subpanel 1675 may include a user subset of the TSs based on user selections of the characteristics 1120 from the contextual data panel 1690. In still other embodiments, the user may select different sets of characteristics 1120 for more than one panel of TSs such that multiple user subsets of TSs are shown in one or more panels such as panels 1650 and 1690.

Various embodiments may, advantageously, offer one or more of the following benefits:
(1) A replay of samples of training or test data that matched activation profiles;
(2) A heat map of a city or state to show a sample of relevant roads or intersections that influenced the training; and
(3) Samples of background noise (played aloud and visualized on an interface) that influenced the training.
(4) An activation window 1630 to display a representation of the activations in the trained model.
(5) A replay of the input data from one or more sensors in the panel 1607 of the event analysis panel 1605.
(6) A contextual data panel 1690, pull-down menu, pop-up menu, and/or the like to allow a user to select contextual data that the user determines to be important for the event of interest.

Note that the activation profile correlator discussed herein may be responsive to selection of contextual dimensions by the user. In response to the selection of contextual dimensions by the user, the activation profile correlator may correlate the selected contextual dimensions optionally with the activation vectors to partition the training data 1110 into a user set of subsets of training and testing samples. The activation profile correlator may then select a user subset of the training and testing samples from the user set of subsets and communicate the user subset to the user interface 1600 for presentation to the user in a panel.

Some embodiments may implement geo-fencing for training and/or testing along with capturing a hierarchical contextual relationship over period of time. Such embodiments may leverage the hierarchical contextual relationship with the geo-fencing over time to predict potential recommendations from systems ahead of time to avoid any catastrophic events. For instance, such embodiments may avoid certain context via, e.g. an input or parameter for a navigation system to cause the navigation system to select a route that can be explained using the hierarchical contextual relationship.

In some embodiments, the context for the original training data can be captured with contextual dimensions and thus be available to the inference. As an example of contextual dimensions, the location of training may appear on actual maps as captured by the navigation systems of vehicles used to acquire the training data. This can be augmented to provide confidence scores on the recommendations based on the geo-fence context of the vehicle at a given instant based on the amount of assertions in the past for the same context, e.g. in a crowd-sourced manner.

The panel 1690 may include contextual data 1690 including the labels, or contextual dimensions, included with the training data for a training model as, e.g., metadata such as the dimensions 1140 shown in FIG. 1B2. The contextual data panel 1690 may include categories such as "weather" and "other contextual dimensions" or may include other or additional categories to broadly describe the subsets of contextual dimensions from which a user may select to further filter the training samples shown in the panels 1650 and 1670 or to select a user subset of the training samples. In the present example, the "weather" category may include, "ALL" to allow the user to choose all weather conditions, effectively not filtering the training samples based on weather. Alternatively, the contextual data panel 1690 may allow the user to select "DRY", "CLOUDY", "FOG", and/or other weather-related contextual dimensions to filter the training data samples in the subpanels 1655 and 1675 to only those weather conditions. Alternatively, selection of the weather conditions may filter training data samples associated with such conditions out of the subpanels 1655 and 1675.

The "other contextual dimensions" may include other contextual dimensions associated with the training samples shown in the subpanels 1655 and 1675. For instance, the other contextual dimensions may include "RR Crossing" to allow the user to filter training samples in the subpanels 1655 and 1675 to include or exclude training samples associated with railroad crossings. The other contextual dimensions may include "Intersection" to allow the user to filter training samples in the subpanels 1655 and 1675 to include or exclude training samples associated with intersections. And the other contextual dimensions may include "Freeway" and "Bridge" to allow the user to filter training samples in the subpanels 1655 and 1675 to include or exclude training samples associated with freeways and bridges. Note that many other contextual dimensions may be available such as the other contextual dimensions discussed herein. Note also that the subpanels 1655 and 1690 may be user configurable in that the panels do not have to include TSs filtered by failures or successes, the panels 1650 and 1670 may be associated with different contextual dimension filters, different training models, different data sources, different types of sensors, and/or the like.

The event analysis panel 1605 may include a panel 1607 to show a video clip or play an audio clip for an event of interest that caused the training model to output the inference for the event. Note that the examples discuss video clips, but the training samples may also include audio clips and the user interface 1600 may include such audio clips along with the video clips or a user may be able to switch between such data sources with the data sources button 1610 of the user interface 1600. In further embodiments, the data sources may include data gathered by different data gathering devices such as the data gathering devices 110A-C shown in FIG. 1A.

The model button 1612 may allow a user to select different models as sources for the training samples in the panels 1650 and 1670. For instance, more than one models may have been trained based on different training data or different subsets of the training data. Furthermore, more than one different, training model may be implemented to output inferences for different types of data. For example, one training model may be trained with video clips or RGB sensor data and a second model may be trained with audio clips associated with background noise, voice commands, and/or road noise. Inference outputs from such models may make decisions such as a decision as to which voice command was provided to the model as input data, and/or the like. Note that same is true with all the training models discussed herein.

The RGB sensor data 1620 in the sensor section of the panel 1605 may display, for example, sensor data from multiple different sensors for the same time frame as the video clip shown in the subpanel 1607 for the event of interest. For instance, the multiple different sensors may include red, green, and blue (RGB) sensors, radar, Lidar, microphone(s), antennas (or antenna arrays), other sound capturing sensors, and/or the like.

The activation window 1630 may provide a visual representation of an activation profile for the model that output the inference for the event of interest. FIG. 1H depicts three buttons to the right of the activation window 1630 to provide three or more different options to depict the activation profile in the activation window 1630. The activation grid button 1632 may display a depiction or representation of a video frame currently shown in the event of interest video clip window 1607. In some embodiments, the depiction may be a pixelated representation that highlights portions of the video frame associated with activations in one or more layers of the model to provide the user with a graphical depiction of the portions of the video frame, if any, that had the most relevant impact on the inference output by the model for the event of interest. In some embodiments, the depiction or representation may not be pixelated but may be another representation of the video frame that highlights portions of the video frame. In some embodiments, the depiction of the activation profile may include variations of colors of pixels to illustrate the intensity of activations by the model in response to the video frame.

The spatial attribution button 1634 may also display a depiction or representation of a video frame currently shown in the panel 1607 by illustrating a spatial representations of activations in one or more layers of the model. For instance, a spatial representation may include a representation of each layer or each non-convolutional layer starting with, e.g., a first layer connected to the input layer and ending with the last layer that connects with the output. Other embodiments may depict any number of layers and may depict only selected layers. In some embodiments, the user may modify the number and types of layers or select the layers to depict by setting a preference. For instance, one or more rows of pixels at the bottom of the activation window 1630 may depict a first layer and may highlight activations with one or more colors for each activated node. In some embodiments, a color associated with an activation may represent an intensity of the activation.

Note that such depictions of the activations of the activation profile may be based on the relevance of the characteristics and/or may be based on the activation vectors output for the layers. For the activation vectors, a one-bit representation may include two intensity levels. A representation of the activations for a one-bit activation vector may use two colors in some embodiments, to represent a logical one or a logical zero. In other embodiments, the representations may use more than two colors by varying the color based on the number of adjacent or proximate nodes that are activated by the video frame or audio frame.

In other embodiments, the spatial attribution button 1634 may cause the activation window 1630 to display a depiction of the spatial relationship of nodes activated in a single layer.

The channel activation button 1636 may display a depiction or representation of a video frame currently shown in the panel 1607 by illustrating a visual depiction of the activation of one or more channels. For instance, the depiction may show red, green, and blue channels for a video frame and may illustrate intensities of the activations of each channel by the size or location of the pixels for each channel. One embodiment, for example, may depict an intensity of activations the three channels with a bar graph that includes a red bar for activations based on the red channel, a green bar for activations based on the green channel, and a blue bar for activations based on the blue channel. Note that the user may be able to select the visual representations for each channel by setting a preference for, e.g., a bar graph, a pie chart, and/or the like. In some embodiments, the depiction may illustrate relative intensities of the channels.

FIG. 1I depicts an embodiment of a block diagram of a system 1700. The system 1700 includes a trusted execution environment (TEE) 1710 and a trusted device 1719. The TEE 1710 may gather training data, activation profiles, scoring, correlation, and/or other explanatory aspects of various models from one or more different sources such as participants of crowd-sourcing such data.

The TEE 1710 may comprise a hardware and/or software isolated processing environment that runs parallel to the operating system of a computer such as a server, workstation, tablet, or the like. The TEE 1710 may provide several security features, such as the isolated execution of code of a program/application, integrity and confidentiality.

The TEE 1710 may comprise a trusted entities 1712 data structure to maintain or store a trusted device identities long with verification and authentication data for each entity in memory. The verification and authentication circuitry 1714 may verify access or communications by a trusted entity by verifying the identity of a trusted device 1719, and/or one or more other devices, as being a trusted entity and by authenticating the trusted device 1719 in accordance with security and privacy policies 1716. For instance, prior to transmitting data or communications to the trusted device 1719, the TEE 1710 may confirm that the trusted device 1719 is associated with a trusted entity and, in some embodiments, verify aspects of the trusted device 1719 such as verification that a hash of trusted software and/or a hash of at least a portion of an environment (hardware configurations and/or software configurations) of the trusted device 1719. In such embodiments, different trusted entities may have access to different portions of data captured during training and validation and/or real-world implementations of participating models. In some embodiments, participation may involve crowd-sourcing data. Some embodiments implement a reward-based approach to attract crowd-sourced participants to sharing their training data, activation profiles, correlation, scoring, and/or explanation aspects.

In some embodiments, the security and privacy policies 1716 may include tamper proof policies to control or manage the level of granularity of activation profiles, correlation, scoring and/or explanation aspects stored or communicated from storage to and/or from other entities via communication circuitry 1718 such as a wired and/or wireless network interface. To illustrate, a TEE 1710 may be implemented in one or more computers to provide a portion of or all the training and validation data in training data storage 1730 for a training model 1742, such as the training data storage 140 in FIG. 1A.

The TEE 1710 may include provide tiered access to training data, activation profiles, correlation, scoring, and/or portions thereof, by trusted entities. In some embodiments, the level of access by a trusted entity, or trusted device, may be based on the type of trusted entity or device, the level of participation by the trusted entity or device, and/or the like. For instance, some trusted entities may only provide training data, activation profiles, and/or the like to the TEE 1710. Some trusted entities may only access the TEE 1710 to obtain, e.g., anonymous training data, anonymous real-world activation profiles, and/or the like.

The trusted device 1719 may comprise an activation profile correlator 1720, a training data storage 1730, and a training and validation system 1740. The activation profile correlator 1720, such as the activation profile correlator 160 shown in FIG. 1A, may The activation profile correlator 1720 may comprise a partition system 1722 to partition training samples gathered by and communicated to the trusted device 1719 from the TEE 1710. The partition system 1722 may identify training samples with the same or similar context in terms of, e.g., the contextual dimensions associated with the training samples.

The activation profile correlator 1720 may comprise an artificial intelligence affinity system 1724 to combine inference outputs and/or activation profiles of training samples partitioned by the partition system 1722 to create an expected result and/or activation profile to include with training samples. In some embodiments, the expected result and/or activation profile from the artificial intelligence affinity system 1724 is included along with the expected result provided with a training sample to provide an alternative or additional error for backpropagation through the training model 1742. In some embodiments, the expected result and/or activation profile from the artificial intelligence affinity system 1724 is the only expected result and/or activation profile provided with a training sample. In some embodiments, the expected result and/or activation profile from the artificial intelligence affinity system 1724 is included with a subset of the training samples used to train the training model 1742. In other embodiments, the expected result and/or activation profile from the artificial intelligence affinity system 1724 is included with all the training samples used to train the training model 1742. Inclusion of the expected result and/or activation profile from the artificial intelligence affinity system 1724 in the training samples, advantageously, trains the training model 1742 to have an artificial intelligence (AI) affinity for inference that outputs similar results as other models.

In some embodiments, the expected result includes a decision or a portion of a decision for, e.g., an autonomous vehicle. In some embodiments, the expected result includes a scoring to include in a scoring matrix or similar data structure. In some embodiments, the expected result includes a correlation of training samples to train a model to partition training samples into groups. In some embodiments, the expected result includes explanatory aspects to include with correlations.

The tracing system 1726 may include a model to trace an activation profile to a scoring matrix or similar data structure to identify training samples with similar activation profiles. The training data storage 1730 may store or maintain training data comprising training samples received from the TEE 1710. In some embodiments, the training samples received from the TEE 1710 via the activation profile correlator 1720 include expected results from the artificial intelligence affinity system 1724. In some embodiments, the training samples received from the TEE 1710 do not include expected results from the artificial intelligence affinity system 1724.

The training and testing system 1740 may train and validate a training model 1742 such as the training and validation system 1201 and the training model 1210 in FIG. 1C. The training and testing system 1740 may train and validate a training model 1742 to output predictions, classification, probabilities, or the like, which are referred to as output 1746. The output 1746 may include inference outputs and auxiliary outputs such as characteristics and/or activation vectors.

During training of the training model 1742, the training model may generate an output 1746 and, in some embodiments, an auxiliary output 1748. The auxiliary output may include, e.g., an activation profile.

The backpropagation logic circuitry 1744 may compare the output 1746 and/or the auxiliary output 1748 to an expected result included with a training sample, compare the output 1746 and/or the auxiliary output 1748 to an expected result and/or activation profile provided by the AI affinity system 1724 for a training sample, and/or both. The backpropagation logic circuitry 1744 may the backpropagate the residual or error generated by the comparison through the training model 1742 to update nodes within the training model 1746.

FIG. 2 depicts an embodiment of a flowchart 200 for a system such as the system (Explainability logic circuitry) 100 shown in FIG. 1A. The flowchart 200 begins in an offline environment with creating training attribute profiles (element 210). One or more models, such as neural networks, are trained by provision of training samples from one or more training data sets. For a single model embodiment, the single model may receive input data from the training data that includes data from one or more different types of sensors. The training data may comprise, e.g., video data, audio data, and/or the like over a period of time for the model to process and classify or predict. If the model mis-classifies the input or provides a low level of confidence (low probability) about a classification, an error can be determined by, e.g., comparing the classification generated by the model against a classification provided with the training sample. The error may be backpropagated through the model to adjust activations of within the model based on the misclassification or low probability. In other embodiments, activations within the model can be adjusted to reinforce correct classifications or high probabilities. In further embodiments, activations within the model can be adjusted for both erroneous classifications or low probabilities and to reinforce correct classifications or high probabilities.

The multiple model environment may include models that focus on different decisions and/or different types or sets of sensor data. In several of these embodiments, the outputs of the models may be combined to determine an action. To illustrate, multiple models may be trained to determine how an autonomous vehicle should react to a railroad crossing. A first model may receive input data related to a first set of sensors, a second model may receive input data related to a second set of sensors, and a third model may receive input data related to a third set of sensors. The outputs or decisions of each model can be trained independently with different sets of sensor input data and, in some cases, independent sets of sensor data from the training data. The system can determine a decision from the three models by combining the inferences from the three models by majority vote, a weighted vote, or other combination process.

The first type of sensors may include video frames and the sensors may include red green and blue (RGB) sensors. Each color may represent a different channel so the system may include one model for each color or a single model for all three colors. For instance, a first model may determine activations based on red pixels in the video frames, a second model may determine activations based on green pixels in the video frames, and a third model may determine activations based on blue pixels in the video frames. A combination of the inferences output by each of the models in response to the event of interest may determine the action taken by an autonomous vehicle. The combination may include a majority vote or weighted combination or may involve one or more machine learning models such as neural networks or statistical models.

The system can optionally determining, creating or receiving contextual dimensions (categorical data) for the training data and associating the contextual dimensions with training samples as well as activations and/or inferences/classifications output by the model (element 215). In some embodiments, for instance, a model may output an activation profile by associating contextual dimensions with activations and may output characteristics (or attributes) as an auxiliary output along with an inference output such as a classification or prediction. The characteristics may comprise the activation profile and may include the contextual dimensions associated with the activations. In some embodiments, for instance, a model may output an activation profile including characteristics as an auxiliary output along with an inference output that associates contextual dimensions with intensities of activations of an activation map. In some embodiments, the model may output an activation profile or pattern along with an inference output. In further embodiments, the model may output the characteristics and the activation profile along with an inference output. For instance, if fog, railroad crossing, audio, and humidity contribute to an inference, the system may output a representation of fog, railroad crossing, audio, and humidity as an auxiliary output with the primary output of the inference such as stop the automobile at the railroad crossing. In further embodiments, the characteristics may include a ranking of the contextual dimensions based on the intensity of activation associated with the contextual dimensions that contributed to the inference.

Once the model(s) are trained, the model(s) are tested or validated with different portions of the training data. During the testing/validation, the model(s) receive the training samples from the training data. In the example of the autonomous vehicle, the testing/validation may also include driving the vehicle with the model(s) in inference mode to determine how the model(s) react during a live driving experience. When a trained model misclassifies an event or provides a low probability of an anticipated classification/inference, an incidence or event of interest occurs (element 220), and, upon identification of the event, the user, whom may be a developer for the model, may want to determine the reason why the trained model made the misclassification.

A model may misclassify an event due to an insufficient amount of training or may misclassify an event as a result of, e.g., a rounding error related to conversion of input data at a node or perceptron within the trained model. For instance, if the misclassification occurred during "bad weather", which can be a general category for a number of different weather conditions such as rain, fog, lightning, severe heat, severe cold, and/or the like, the model may misclassify an event if the model did not receive enough training for different variations of bad weather conditions. To illustrate, the trained model may have been trained with rain and fog but not a heavy rain or a dense fog that reduced the effective operation of one or more sensors. Lightning, severe heat or severe cold may also affect the operation of one or more of the vehicle's sensors or circuitry coupled with one or more of the sensors.

After identifying the occurrence of the incident or event of interest, many embodiments may load the incident data from the event into storage of a computing device (element 225) such as the training data storage 140 shown in FIG. 1 and load an activation profile (attribute profile) for the incident data (element 230) into a computing device such as the activation profile correlator 160 shown in FIG. 1A, for processing. Some embodiments may also load contextual dimensions such as characteristics associated with the misclassification or low confidence prediction by the trained model on the computing device (element 235) to optionally filter training data (element 240) to determine a set of training samples of the training data that correlate with the misclassification or low confidence prediction by the trained model. For instance, some embodiments may identify one or more key contextual dimensions, default contextual dimensions, or user selected contextual dimensions to filter the training data. To illustrate, if the event of interest occurs at an intersection, such embodiments may filter the training data to only include training data associated with intersections.

The identification of related training samples from the training data may, advantageously, provide information about the reason for the misclassification or low confidence by one or more of the trained models during inference at the event of interest. For example, the one or more trained models may all provide a correct classification or high level of confidence during training but one of the trained models may provide a misclassification or low level of confidence for the inference based on the event of interest in the field test. Thus, the user can advantageously focus review on the training data to determine why the one of the models provided a misclassification or low level of confidence for the inference based on the event of interest in the field test.

To further illustrate, for a trained model that focuses on RGB channels, the user may find that under certain conditions (weather, road surface types, temperature, road types, etc.), one of the three channels does not detect a relevant object, which can be detected based on review of the activation profile for that channel. Such an error may relate to a faulty sensor, a lack of sufficient training for the model under the conditions associated with the inference, a condition that affects the accuracy of the sensor, or the like.

As another example, the system may output an inference output that misclassifies a stop sign as another type of sign in a field test. The system may filter the training data to restrict training samples to intersections with signs and present the training samples intersections with signs. The user may notice that the sign at the intersection during the field test includes a stop sign upon which someone placed a sticker. Then, upon review of the training samples, the user may find, for instance, that the sign is not classified as a stop sign and may select an option to further filter the training samples to intersections with stop signs. As a result, the user may determine that the training samples lack a sufficient number of stop signs with stickers and may determine that subsequent training should include more stops signs with stickers attached to the face of the stop signs so the model or models may correctly identify the stop signs in subsequent field tests.

After loading the activation profile for the event of interest (the incident), the activation profile correlator may compare the activation profile associated with the inference for the event against the activation profiles of the training samples (optionally, the filtered training samples) (element 245). Comparison of the activation profiles of the training data against the activation profile of the inference for the event may provide a set of training samples that correlate with the event to advantageously reduce the amount of training samples provided to a user for presentation (element 250). For instance, the training samples may be loaded into a user interface including a viewer or other processing module such as the user interface 172 shown in FIG. 1A or the user interface 1600 shown in FIG. 1H.

In element 250, a user may view the returned data, or that data may undergo additional processing, e.g., for further similarity matching. Activation approaches to explainability include various approaches for exposing how a deep neural network (DNN) is behaving. Some of these approaches lend themselves to a comparison of various profiles, thus allowing a matching with training data.

Many embodiments allow the user to visualize what a model such as a deep neural network (DNN) is "paying attention to," what features are most salient via a user interface such as the user interface 1600 shown in FIG. 1H. The user may choose to see a heat map of an image to determine the portions of the image that caused activations or the most intense activations. Such information may allow the user to assess what the model determined to be important about the event and determine if the model is correctly selecting the most important portions of the image.

In some embodiments, the training data and inference data may include audio, video, radar, and/or the like and a map of the activations in the model based on portions of the data sample from the event. Some embodiments may match features (e.g., by automatic visual comparison of colors and shapes) between training and the event in question and present such visualizations to a user.

Some embodiments may provide explanatory text that correlates with the most salient feature(s) associated with the event. Such embodiments may correlate text with training data such as by comparing the text with text in metadata associated with the training samples and return examples from the training data of images that include highly correlated text.

In the case where hardware such as actual memory addresses, networking components or addresses, processor components or cores, or other hardware use is monitored for activation during inference, some embodiments may provide activation profiles or activation maps of hardware (memory, network components or addresses, processor components or cores) for visualizations by the user in response to the training data and the event if training occurred on hardware that is similar to the hardware in which the model encountered the event.

Some embodiments may use contextual dimensions to filter training data to identify a set of training samples that correlate to the event of interest for comparison by a user. For example, in the car accident example, the system, such as the system 100 in FIG. 1A, may provide training samples that match geographic locations or weather conditions. Furthermore, some embodiments allow the user to choose which contextual dimensions to use for filtering. To enable this, contextual dimensions may be included as metadata with training data and the event of interest data.

The number of contextual dimensions that are relevant and that can be helpful to be shown as explanations can be potentially large, so some embodiments determine which contextual dimensions are the most interesting or most closely correlate with the inference of an event of interest (such as a misclassification or a correct classification). For example, training samples can be provided that match two contextual dimensions, i.e. weather and road conditions. However, some dimensions can be more interesting (correlated to the input image) than others. Some embodiments may cluster the matched samples for each contextual dimensions using one or more methods. Then, the system could determine how close (or far) the input image is to (from) each of the cluster's centroids and show only the contextual dimensions that are "closest" to the input image. The "closest" contextual dimensions may be selected based on one or more preferences set by a user and/or default preferences, and/or may be based on the number of training samples that result from identification of the "closest" contextual dimensions. In some embodiments, for instance, the user may be able to adjust a sliding scale to identify the closest contextual dimensions and may receive visual feedback such as images or text to indicate the number of training samples or other factor associated with identification of the closest contextual dimensions. Note that that contextual dimensions are also referred to herein as contextual categories, categorical data, features (feature vectors), attributes, characteristics, and metadata, and may include weather conditions (temperature, fog, smog, humidity, rain, etc.), geographic locations such as specific intersections and/or types of intersections, road surface or material, road types such as highways or residential roads, audio types, object or obstruction types, chemical presence types (odors or vapors detected), and/or the like. Clustering based on the feature vectors/raw data may, advantageously, provide a user with a better understanding of why a training sample is (which contextual dimensions make the training sample) relevant to the event of interest.

In several embodiments, the user interface such as the user interface 1600 shown in FIG. 1H, provides a user with an opportunity to rate training samples as "relevant" or "not relevant" and, in some embodiments, to provide an explanation for the rating. In such embodiments, the user may filter training samples based upon user ratings.

Figure 3:
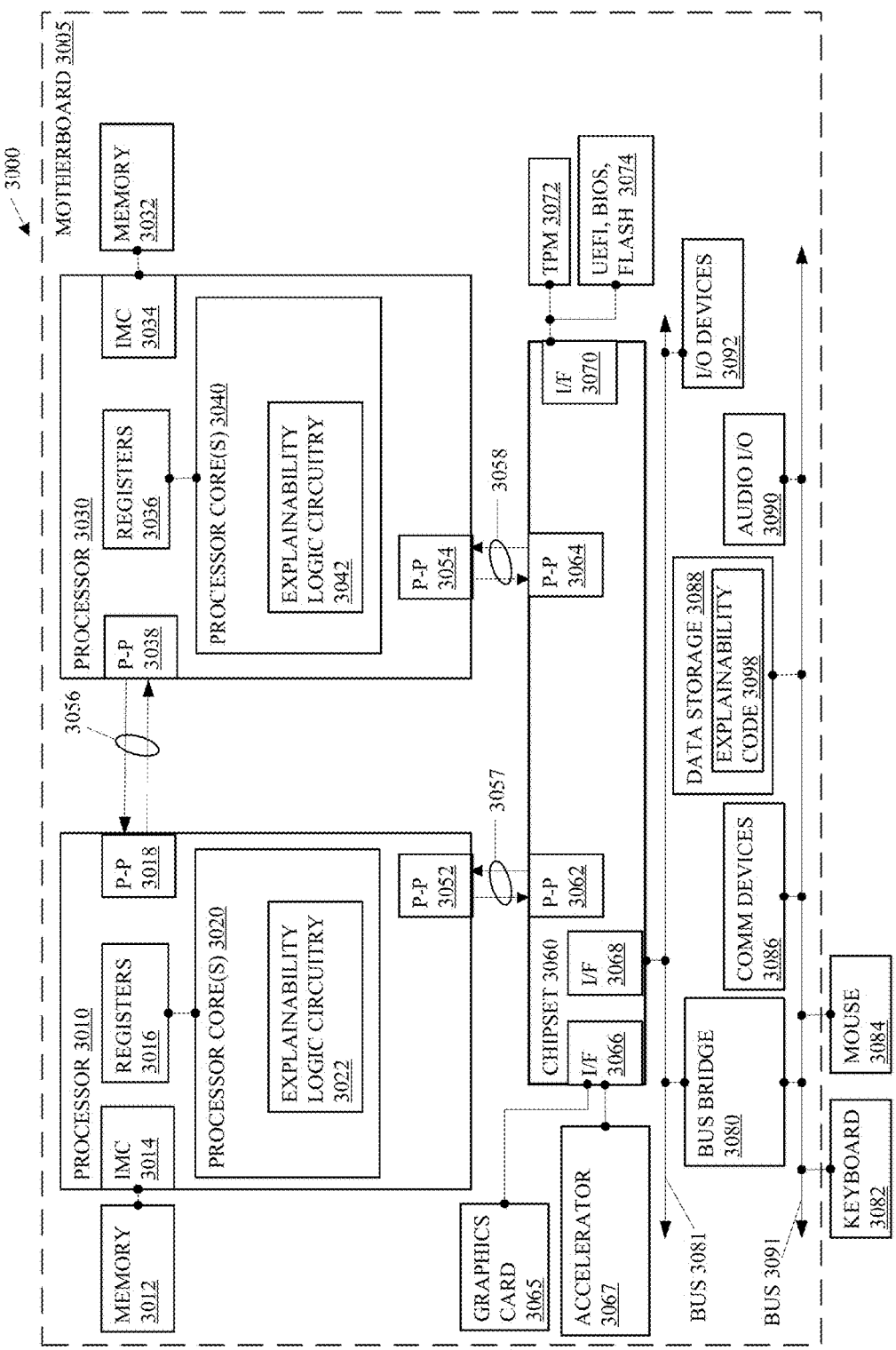
FIG. 3 depicts an embodiment of a system such as the presentation device, training data storage device, and/or the data gathering devices shown in FIG. 1A.

FIG. 3 illustrates an embodiment of a system 3000 such as the system 100 in FIG. 1A. In some embodiments, the system 100 may represent one or more of the data gathering devices 110A, 110B, and 110C; the training data storage 140; and the presentation device 170 in FIG. 1A.

The system 3000 is a computer system with multiple processor cores such as a distributed computing system, supercomputer, high-performance computing system, computing cluster, mainframe computer, mini-computer, client-server system, personal computer (PC), workstation, server, portable computer, laptop computer, tablet computer, handheld device such as a personal digital assistant (PDA), or other device for processing, displaying, or transmitting information. Similar embodiments may comprise, e.g., entertainment devices such as a portable music player or a portable video player, a smart phone or other cellular phone, a telephone, a digital video camera, a digital still camera, an external storage device, or the like. Further embodiments implement larger scale server configurations. In other embodiments, the system 3000 may have a single processor with one core or more than one processor. Note that the term "processor" refers to a processor with a single core or a processor package with multiple processor cores.

As shown in FIG. 3, system 3000 comprises a motherboard 3005 for mounting platform components. The motherboard 3005 is a point-to-point interconnect platform that includes a first processor 3010 and a second processor 3030 coupled via a point-to-point interconnect 3056 such as an Ultra Path Interconnect (UPI). In other embodiments, the system 3000 may be of another bus architecture, such as a multi-drop bus. Furthermore, each of processors 3010 and 3030 may be processor packages with multiple processor cores including processor core(s) 3020 and 3040, respectively.

While the system 3000 is an example of a two-socket (2S) platform, other embodiments may include more than two sockets or one socket. For example, some embodiments may include a four-socket (4S) platform or an eight-socket (8S) platform. Each socket is a mount for a processor and may have a socket identifier. Note that the term platform refers to the motherboard with certain components mounted such as the processors 3010 and the chipset 3060. Some platforms may include additional components and some platforms may only include sockets to mount the processors and/or the chipset.

The first processor 3010 includes an integrated memory controller (IMC) 3014 and point-to-point (P-P) interfaces 3018 and 3052. Similarly, the second processor 3030 includes an IMC 3034 and P-P interfaces 3038 and 3054. The IMC's 3014 and 3034 couple the processors 3010 and 3030, respectively, to respective memories, a memory 3012 and a memory 3032. The memories 3012 and 3032 may be portions of the main memory (e.g., a dynamic random-access memory (DRAM)) for the platform such as double data rate type 3 (DDR3) or type 4 (DDR4) synchronous DRAM (SDRAM). In the present embodiment, the memories 3012 and 3032 locally attach to the respective processors 3010 and 3030. In other embodiments, the main memory may couple with the processors via a bus and shared memory hub.

The processors 3010 and 3030 comprise caches coupled with each of the processor core(s) 3020 and 3040, respectively. The first processor 3010 couples to a chipset 3060 via P-P interconnects 3052 and 3062 and the second processor 3030 couples to a chipset 3060 via P-P interconnects 3054 and 3064. Direct Media Interfaces (DMIs) 3057 and 3058 may couple the P-P interconnects 3052 and 3062 and the P-P interconnects 3054 and 3064, respectively. The DMI may be a high-speed interconnect that facilitates, e.g., eight Giga Transfers per second (GT/s) such as DMI 3.0. In other embodiments, the processors 3010 and 3030 may interconnect via a bus.

The chipset 3060 may comprise a controller hub such as a platform controller hub (PCH). The chipset 3060 may include a system clock to perform clocking functions and include interfaces for an I/O bus such as a universal serial bus (USB), peripheral component interconnects (PCIs), serial peripheral interconnects (SPIs), integrated interconnects (I2Cs), and the like, to facilitate connection of peripheral devices on the platform. In other embodiments, the chipset 3060 may comprise more than one controller hub such as a chipset with a memory controller hub, a graphics controller hub, and an input/output (I/O) controller hub.

In the present embodiment, the chipset 3060 couples with a trusted platform module (TPM) 3072 and the UEFI, BIOS, Flash component 3074 via an interface (I/F) 3070. The TPM 3072 is a dedicated microcontroller designed to secure hardware by integrating cryptographic keys into devices. The UEFI, BIOS, Flash component 3074 may provide pre-boot code.

Furthermore, chipset 3060 includes an I/F 3066 to couple chipset 3060 with a high-performance graphics engine, graphics card 3065 and an accelerator card 3067. The I/F 3066 may be, for example, a Peripheral Component Interconnect-enhanced (PCI-e). The graphics card 3065 and an accelerator card 3067 may comprise target devices such as the presentation device 170 illustrated in FIG. 1A.

Referring again to FIG. 3, various I/O devices 3092 couple to the bus 3081, along with a bus bridge 3080 which couples the bus 3081 to a second bus 3091 and an I/F 3068 that connects the bus 3081 with the chipset 3060. In one embodiment, the second bus 3091 may be a low pin count (LPC) bus. Various devices may couple to the second bus 3091 including, for example, a keyboard 3082, a mouse 3084, communication devices 3086 and a data storage unit 3088 that may store code such as the explainability code 3098. The explainability code 3098 may comprise code to implement the explainability logic circuitry such as the activation profile correlator 160, the user interface 172, and/or other portions of or all system 100 illustrated in FIG. 1A and may also comprise code to implement the explainability logic circuitry 3022 and 3042 in the processor cores 3020 and 3040, respectively. During execution by processor core(s)s 3020 and/or 3040, the explainability code 3098 (or portions thereof) may be located in memory such as the memory 3012, memory 3032, registers 3016, register 3036, data storage 3088, I/O devices 3092, and/or any other data storage accessible by the system 3000.

Furthermore, an audio I/O 3090 may couple to second bus 3091. Many of the I/O devices 3092, communication devices 3086, and the data storage unit 3088 may reside on the motherboard 3005 while the keyboard 3082 and the mouse 3084 may be add-on peripherals. In other embodiments, some or all the I/O devices 3092, communication devices 3086, and the data storage unit 3088 are add-on peripherals and do not reside on the motherboard 3005.

Figure 4:
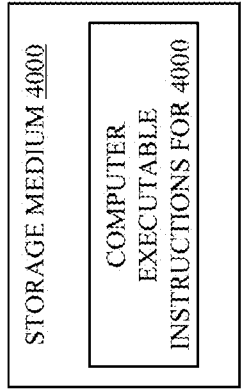
FIGS. 4-5 depicts embodiments of a storage medium and a computing platform.

FIG. 4 illustrates an example of a storage medium 4000 to store processor data structures. Storage medium 4000 may comprise an article of manufacture. In some examples, storage medium 4000 may include any non-transitory computer readable medium or machine-readable medium, such as an optical, magnetic or semiconductor storage. Storage medium 4000 may store various types of computer executable instructions, such as instructions to implement logic flows and/or techniques described herein like explainability code 3098 or explainability logic circuitry 3022 and 3042. Examples of a computer readable or machine-readable storage medium may include any tangible media capable of storing electronic data, including volatile memory or non-volatile memory, removable or non-removable memory, erasable or non-erasable memory, writeable or re-writeable memory, and so forth. Examples of computer executable instructions may include any suitable type of code, such as source code, compiled code, interpreted code, executable code, static code, dynamic code, object-oriented code, visual code, and the like. The examples are not limited in this context.

Figure 5:
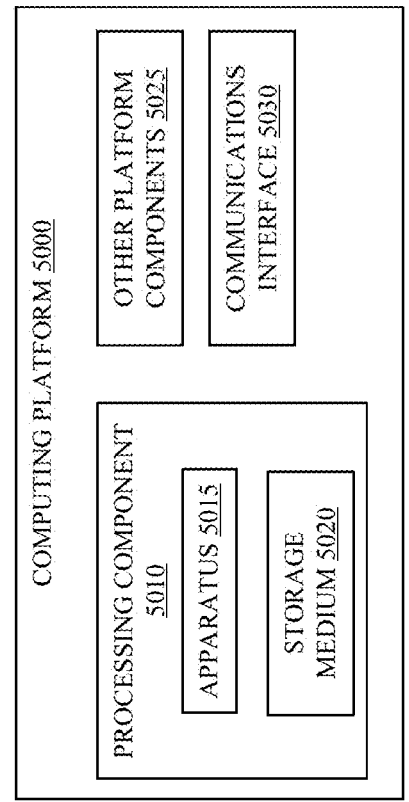

FIG. 5 illustrates an example computing platform 5000. In some examples, as shown in FIG. 5, computing platform 5000 may include a processing component 5010, other platform components or a communications interface 5030. According to some examples, computing platform 5000 may be implemented in a computing device such as a server in a system such as a data center or server farm that supports a manager or controller for managing configurable computing resources like system 100 in FIG. 1A, system 1200 in FIG. 1C, and systems 1530 and 1540 in FIG. 1G. Furthermore, the communications interface 1330 may comprise a wake-up radio (WUR) and may be capable of waking up a main radio of the computing platform 5000.

According to some examples, processing component 5010 may execute processing operations or logic for apparatus 5015 described herein. Processing component 5010 may include various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements, which may reside in the storage medium 5020, may include software components, programs, applications, computer programs, application programs, device drivers, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given example.

In some examples, other platform components 5025 may include common computing elements, such as one or more processors, multi-core processors, co-processors, memory units, chipsets, controllers, peripherals, interfaces, oscillators, timing devices, video cards, audio cards, multimedia input/output (I/O) components (e.g., digital displays), power supplies, and so forth. Examples of memory units may include without limitation various types of computer readable and machine readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory), solid state drives (SSD) and any other type of storage media suitable for storing information.

In some examples, communications interface 5030 may include logic and/or features to support a communication interface. For these examples, communications interface 5030 may include one or more communication interfaces that operate according to various communication protocols or standards to communicate over direct or network communication links. Direct communications may occur via use of communication protocols or standards described in one or more industry standards (including progenies and variants) such as those associated with the PCI Express specification. Network communications may occur via use of communication protocols or standards such as those described in one or more Ethernet standards promulgated by the Institute of Electrical and Electronics Engineers (IEEE). For example, one such Ethernet standard may include IEEE 802.3-2012, Carrier sense Multiple access with Collision Detection (CSMA/CD) Access Method and Physical Layer Specifications, Published in December 2012 (hereinafter "IEEE 802.3"). Network communication may also occur according to one or more OpenFlow specifications such as the OpenFlow Hardware Abstraction API Specification. Network communications may also occur according to Infiniband Architecture Specification, Volume 1, Release 1.3, published in March 2015 ("the Infiniband Architecture specification").

Computing platform 5000 may be part of a computing device that may be, for example, a server, a server array or server farm, a web server, a network server, an Internet server, a work station, a mini-computer, a main frame computer, a supercomputer, a network appliance, a web appliance, a distributed computing system, multiprocessor systems, processor-based systems, or combination thereof. Accordingly, functions and/or specific configurations of computing platform 5000 described herein, may be included or omitted in various embodiments of computing platform 5000, as suitably desired.

The components and features of computing platform 5000 may be implemented using any combination of discrete circuitry, ASICs, logic gates and/or single chip architectures. Further, the features of computing platform 5000 may be implemented using microcontrollers, programmable logic arrays and/or microprocessors or any combination of the foregoing where suitably appropriate. It is noted that hardware, firmware and/or software elements may be collectively or individually referred to herein as "logic".

It should be appreciated that the exemplary computing platform 5000 shown in the block diagram of FIG. 5 may represent one functionally descriptive example of many potential implementations. Accordingly, division, omission or inclusion of block functions depicted in the accompanying figures does not infer that the hardware components, circuits, software and/or elements for implementing these functions would necessarily be divided, omitted, or included in embodiments.

One or more aspects of at least one example may be implemented by representative instructions stored on at least one machine-readable medium which represents various logic within the processor, which when read by a machine, computing device or system causes the machine, computing device or system to fabricate logic to perform the techniques described herein. Such representations, known as "IP cores," may be stored on a tangible, machine readable medium and supplied to various customers or manufacturing facilities to load into the fabrication machines that actually make the logic or processor.

Various examples may be implemented using hardware elements, software elements, or a combination of both. In some examples, hardware elements may include devices, components, processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. In some examples, software elements may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Some examples may include an article of manufacture or at least one computer-readable medium. A computer-readable medium may include a non-transitory storage medium to store logic. In some examples, the non-transitory storage medium may include one or more types of computer-readable storage media capable of storing electronic data, including volatile memory or non-volatile memory, removable or non-removable memory, erasable or non-erasable memory, writeable or re-writeable memory, and so forth. In some examples, the logic may include various software elements, such as software components, programs, applications, computer programs, application programs, system programs, machine programs, operating system software, middleware, firmware, software modules, routines, subroutines, functions, methods, procedures, software interfaces, API, instruction sets, computing code, computer code, code segments, computer code segments, words, values, symbols, or any combination thereof.

According to some examples, a computer-readable medium may include a non-transitory storage medium to store or maintain instructions that when executed by a machine, computing device or system, cause the machine, computing device or system to perform methods and/or operations in accordance with the described examples. The instructions may include any suitable type of code, such as source code, compiled code, interpreted code, executable code, static code, dynamic code, and the like. The instructions may be implemented according to a predefined computer language, manner or syntax, for instructing a machine, computing device or system to perform a certain function. The instructions may be implemented using any suitable high-level, low-level, object-oriented, visual, compiled and/or interpreted programming language.

Some examples may be described using the expression "in one example" or "an example" along with their derivatives. These terms mean that a particular feature, structure, or characteristic described in connection with the example is included in at least one example. The appearances of the phrase "in one example" in various places in the specification are not necessarily all referring to the same example.

Some examples may be described using the expression "coupled" and "connected" along with their derivatives. These terms are not necessarily intended as synonyms for each other. For example, descriptions using the terms "connected" and/or "coupled" may indicate that two or more elements are in direct physical or electrical contact with each other. The term "coupled," however, may also mean that two or more elements are not in direct contact with each other, but yet still co-operate or interact with each other.

In addition, in the foregoing Detailed Description, it can be seen that various features are grouped together in a single example for the purpose of streamlining the disclosure. This method of disclosure is not to be interpreted as reflecting an intention that the claimed examples require more features than are expressly recited in each claim. Rather, as the following claims reflect, inventive subject matter lies in less than all features of a single disclosed example. Thus, the following claims are hereby incorporated into the Detailed Description, with each claim standing on its own as a separate example. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code to reduce the number of times code must be retrieved from bulk storage during execution. The term "code" covers a broad range of software components and constructs, including applications, drivers, processes, routines, methods, modules, firmware, microcode, and subprograms. Thus, the term "code" may be used to refer to any collection of instructions which, when executed by a processing system, perform a desired operation or operations.

Logic circuitry, devices, and interfaces herein described may perform functions implemented in hardware and also implemented with code to execute on one or more processors. Logic circuitry refers to the hardware or the hardware and code that implements one or more logical functions. Circuitry is hardware and may refer to one or more circuits. Each circuit may perform a particular function. A circuit of the circuitry may comprise discrete electrical components interconnected with one or more conductors, an integrated circuit, a chip package, a chip set, memory, or the like. Integrated circuits include circuits created on a substrate such as a silicon wafer and may comprise components. And integrated circuits, processor packages, chip packages, and chipsets may comprise one or more processors.

Processors may receive signals such as instructions and/or data at the input(s) and may include processing circuitry to process the signals to generate the at least one output. While executing code, the code changes the physical states and characteristics of transistors that make up a processor pipeline and/or registers. The physical states of the transistors translate into logical bits of ones and zeros stored in registers within the processor. The processor can transfer the physical states of the transistors into registers and transfer the physical states of the transistors to another storage medium.

A processor may comprise circuits to perform one or more sub-functions implemented to perform the overall function of the processor. One example of a processor is a state machine or an application-specific integrated circuit (ASIC) that includes at least one input and at least one output. A state machine may manipulate the at least one input to generate the at least one output by performing a predetermined series of serial and/or parallel manipulations or transformations on the at least one input.

The logic as described above may be part of the design for an integrated circuit chip. The chip design is created in a graphical computer programming language and stored in a computer storage medium or data storage medium (such as a disk, tape, physical hard drive, or virtual hard drive such as in a storage access network). If the designer does not fabricate chips or the photolithographic masks used to fabricate chips, the designer transmits the resulting design by physical means (e.g., by providing a copy of the storage medium storing the design) or electronically (e.g., through the Internet) to such entities, directly or indirectly. The stored design is then converted into the appropriate format (e.g., GDSII) for the fabrication.

The resulting integrated circuit chips can be distributed by the fabricator in raw wafer form (that is, as a single wafer that has multiple unpackaged chips), as a bare die, or in a packaged form. In the latter case, the chip is mounted in a single chip package (such as a plastic carrier, with leads that are affixed to a motherboard or other higher-level carrier) or in a multichip package (such as a ceramic carrier that has either or both surface interconnections or buried interconnections). In any case, the chip is then integrated with other chips, discrete circuit elements, and/or other signal processing devices as part of either (a) an intermediate product, such as a processor board, a server platform, or a motherboard, or (b) an end product.

Several embodiments have one or more potentially advantages effects. For instance, through input on a user interface, the user may quickly view the contextual dimensions in which samples of the most relevant training or test data were obtained, advantageously allowing the user to evaluate why the inference did not work well in the contextual dimensions of an erroneous inference. Additionally, a hierarchical contextual relationship based on contextual dimensions, advantageously helps to build better explanations eventually leading to reasoning capability on how system behaved for training versus inference.

Some embodiments may generate a data structure such as a scoring matrix to associate the indications of relevance of the characteristics of each of the training samples in the training data with the training samples to advantageously facilitate various hashing operations on vectors in the scoring matrix to identify training samples related to characteristics of an event of interest.

Some embodiments may identify the groups or clusters of the training samples to advantageously determine how close (or far) a training sample is to (from) each of the cluster's centroids, and advantageously show only the contextual dimensions to which the input image is "closest". This approach on clustering along each contextual dimension can advantageously provide a better understanding of why a training sample is relevant, i.e., which contextual dimension(s) make the training sample relevant.

Some embodiments implement Model Trees (MTs) as a locality sensitive hash to advantageously yield human interpretable criteria for partitioning training samples into subsets based on activation profiles. Such MTs are also advantageously hierarchical.

Training models that output activation vectors may advantageously offer a deeper resolution of the specific performance of a machine learning model. Furthermore, a locality sensitive hashing (LSH) model may, advantageously, determine the closest activation profile(s) associated within the subsets of the training and test samples by correlating the activation profiles (the row of characteristics indicators and activation vectors associated with each of the training data samples) or by determining a specific hash of the scoring matrix.

Subsets of training and test samples (TSs) may include samples from training data and also in real-world testing that correlated with activation characteristics and/or vectors during an event of interest, advantageously providing context for a specific performance by the machine learning model via a user interface.

Various embodiments may, advantageously, offer: (1) A replay of samples of training or test data that matched activation profiles; (2) A heat map of a city or state to show a sample of relevant roads or intersections that influenced the training; and/or (3) Samples of background noise (played aloud and visualized on an interface) that influenced the training.

The identification of related training samples from the training data may, advantageously, provide information about the reason for the misclassification or low confidence by one or more of the models during inference at the event of interest. Thus, the user can advantageously focus review on the training data to determine why the one of the models provided a misclassification or low level of confidence for the inference based on the event of interest in the field test.

Comparison of the attribute profiles of the training data against the attribute profile of the inference for the event may provide a set of training samples that correlate with the event to advantageously reduce the amount of training samples provided to a user for presentation via a user interface. Furthermore, clustering based on the feature vectors/raw data may, advantageously, provide a user with a better understanding of why (which context category) a training sample is relevant to the event of interest.

EXAMPLES OF FURTHER EMBODIMENTS

The following examples pertain to further embodiments. Specifics in the examples may be used anywhere in one or more embodiments.

Example 1 is an apparatus, the apparatus comprising: memory; and logic circuitry to determine a first activation profile associated with an event, the first activation profile based on activation of nodes in one or more layers of a neural network during inference to generate an inference output; to correlate the first activation profile against a second activation profile associated with a first training sample of training data; to determine that the first training sample is associated with the event based on correlation; and to output an indicator to identify the first training sample as being associated with the event. In Example 2, the apparatus of Example 1, the logic circuitry to partition the training data based on one or more contextual dimensions associated with the event to identify multiple subsets of training samples in the training data, each of the training samples to be associated with a set of one or more contextual dimensions. In Example 3, the apparatus of Example 2, the logic circuitry to determine a first subset of training samples by clustering the training data based on characteristics associated with the training data with a locality sensitive hashing (LSH), the characteristics associated with indicators to indicate an activation intensity associated with the contextual dimensions. In Example 4, the apparatus of Example 3, the logic circuitry to determine the first subset of training samples by clustering the training data with a locality sensitive hashing (LSH) based on a combination of the characteristics and activation vectors of the first subset of training samples. In Example 5, the apparatus of Example 2, the logic circuitry to determine a first subset of training samples by clustering the training data based on activation vectors of the first subset of training samples with a locality sensitive hashing (LSH). In Example 6, the apparatus of Example 1, wherein determination of the first activation profile associated with the event comprises capture of characteristics associated with the event, the characteristics to comprise values associated with contextual dimensions. In Example 7, the apparatus of Example 1, wherein the correlation comprises comparison of the first activation profile with multiple subsets of training samples in the training data to associate the first activation profile with one subset of the multiple subsets of training samples in the training data based on characteristics associated with the event, an activation vector associated with the event, or a combination of the characteristics and the activation vector associated with the event. In Example 8, the apparatus of Example 1, wherein the correlation comprises tracing of the first activation profile back to one subset of multiple subsets of training samples in the training data based on characteristics associated with the event, an activation vector associated with the event, or a combination of the characteristics and the activation vector associated with the event. In Example 9, the apparatus of Example 1, the event to be a situation for which the neural network makes a decision or generates an inference output, the event to be represented by an instance of input data or a series of input data provided to the neural network. In Example 10, the apparatus of Example 1, the logic circuitry to cluster the training samples based on a hierarchy of contextual dimensions. In Example 11, the apparatus of Example 1, the logic circuitry to cluster the training samples based on activation vectors associated with the training samples. In Example 12, the apparatus of Example 1, the logic circuitry to identify a scoring matrix for a first subset of training samples based on the first activation profile for a field sample based on the event. In Example 13, the apparatus of Example 1, the first activation profile to comprise characteristics associated with the event, an activation vector associated with the event, or a combination of the characteristics and the activation vector associated with the event. In Example 14, the apparatus of Example 1, the logic circuitry to comprise a trusted execution environment to gather training samples from different models. In Example 15, the apparatus of Example 1, the logic circuitry to comprise a trusted execution environment to communicate with remote devices to receive training samples through crowd-sourcing.

Example 16 is a method, the method comprising: receiving, by logic circuitry, a first activation profile associated with an event, the first activation profile to comprise an auxiliary output from a neural network based on activation of nodes in one or more layers of the neural network during inference to generate an inference output; correlating, by logic circuitry, the first activation profile against a second activation profile associated with a first training sample of training data; determining, by logic circuitry, that the first training sample is associated with the event based on the correlating; and outputting, by logic circuitry, an indicator to identify the first training sample as being associated with the event. In Example 17, the method of Example 16, further comprising partitioning the training data based on one or more contextual dimensions associated with the event to identify multiple subsets of training samples in the training data, each of the training samples to be associated with a set of one or more contextual dimensions. In Example 18, the method of Example 17, further comprising identifying a first subset of training samples by clustering the training data based on characteristics associated with the training data with a locality sensitive hashing (LSH), the characteristics associated with indicators to indicate an activation intensity associated with the contextual dimensions. In Example 19, the method of Example 18, wherein identifying the first set of training samples comprises clustering the training data with a locality sensitive hashing (LSH) based on a combination of the characteristics and activation vectors of the first set of training samples. In Example 20, the method of Example 17, further comprising identifying a first subset of training samples by clustering the training data based on activation vectors of the first subset of training samples with a locality sensitive hashing (LSH). In Example 21, the method of Example 16, wherein receipt of the first activation profile associated with the event comprises capture of characteristics associated with the event, the characteristics associated with indicators to indicate an activation intensity associated with the contextual dimensions. In Example 22, the method of Example 16, wherein the correlation comprises comparison of the first activation profile with multiple subsets of training samples in the training data to associate the first activation profile with one subset of the multiple subsets of training samples in the training data based on characteristics associated with the event, an activation vector associated with the event, or a combination of the characteristics and the activation vector associated with the event. In Example 23, the method of Example 16, wherein the correlation comprises tracing of the first activation profile back to one subset of multiple subsets of training samples in the training data based on characteristics associated with the event, an activation vector associated with the event, or a combination of the characteristics and the activation vector associated with the event. In Example 24, the method of Example 16, the event to be a situation for which the neural network makes a decision or generates an inference output, the event to be represented by an instance of input data or a series of input data provided to the neural network. In Example 25, the method of Example 16, further comprising clustering the training samples based on a hierarchy of contextual dimensions. In Example 26, the method of Example 16, further comprising clustering the training samples based on activation vectors associated with the training samples. In Example 27, the method of Example 16, further comprising identifying a scoring matrix for a subset of training samples based on the first activation profile for a field sample based on the event. In Example 28, the method of Example 16, the first activation profile to comprise characteristics associated with the event, an activation vector associated with the event, or a combination of the characteristics and the activation vector associated with the event. In Example 29, the method of Example 16, further comprising executing a trusted execution environment to gather training samples from different models. In Example 30, the method of Example 16, further comprising communicating, via a trusted execution environment, with remote devices to receive training samples through crowd-sourcing.

Example 31 is a computer program product comprising a non-transitory computer-readable medium, comprising instructions, which when executed by a processor cause the processor to perform operations, the operations to: access memory to determine a first activation profile associated with an event, the first activation profile based on activation of nodes in one or more layers of the neural network during inference to generate an inference output; correlate the first activation profile against a second activation profile associated with a first training sample of training data; determine that the first training sample is associated with the event based on correlation; and output an indicator to identify the first training sample as being associated with the event. In Example 32, the computer program product of Example 31, wherein the operations further comprise operations to partition the training data based on one or more contextual dimensions associated with the event to identify multiple subsets of training samples in the training data, each of the training samples to be associated with a set of one or more contextual dimensions. In Example 33, the computer program product of Example 32, wherein the operations further comprise operations to identify a first subset of training samples by clustering the training data based on characteristics associated with the training data with a locality sensitive hashing (LSH), the characteristics associated with indicators to indicate an activation intensity associated with the contextual dimensions. In Example 34, the computer program product of Example 33, wherein operations to identify the first subset of training samples comprise operations to cluster the training data with a locality sensitive hashing (LSH) based on a combination of the characteristics and activation vectors of the first subset of training samples. In Example 35, the computer program product of Example 31, wherein the operations further comprise operations to identifying the first subset of training samples by clustering the training data based on activation vectors of the first subset of training samples with a locality sensitive hashing (LSH). In Example 36, the computer program product of Example 31, wherein determination of the first activation profile associated with the event comprises capture of characteristics associated with the event, the characteristics to comprise values associated with contextual dimensions. In Example 37, the computer program product of Example 31, wherein the correlation comprises comparison of the first activation profile with multiple subsets of training samples in the training data to associate the first activation profile with one subset of the multiple subsets of training samples in the training data based on characteristics associated with the event, an activation vector associated with the event, or a combination of the characteristics and the activation vector associated with the event. In Example 38, the computer program product of Example 31, wherein the correlation comprises tracing of the first activation profile back to one subset of multiple subsets of training samples in the training data based on characteristics associated with the event, an activation vector associated with the event, or a combination of the characteristics and the activation vector associated with the event. In Example 39, the computer program product of Example 31, the event to be a situation for which the neural network makes a decision or generates an inference output, the event to be represented by an instance of input data or a series of input data provided to the neural network. In Example 40, the computer program product of Example 31, wherein the operations further comprise operations to cluster the training samples based on a hierarchy of contextual dimensions. In Example 41, the computer program product of Example 31, wherein the operations further comprise operations to cluster the training samples based on activation vectors associated with the training samples. In Example 42, the computer program product of Example 31, wherein the operations further comprise operations to identify a scoring matrix for a subset of training samples based on the first activation profile for a field sample based on the event. In Example 43, the computer program product of Example 31, the first activation profile to comprise characteristics associated with the event, an activation vector associated with the event, or a combination of the characteristics and the activation vector associated with the event. In Example 44, the computer program product of Example 31, wherein the operations further comprise operations to execute a trusted execution environment to gather training samples from different models. In Example 45, the computer program product of Example 31, wherein the operations further comprise operations to communicate, via a trusted execution environment, with remote devices to receive training samples through crowd-sourcing.

Example 46 is a system, the system comprising: a presentation device to select at least a first subset of training samples of training data to present to a user and to display a representation of the first subset of training samples and a representation of a field sample for an event; and logic circuitry coupled with the presentation device to determine a first activation profile associated with the event, the first activation profile based on activation of nodes in one or more layers of a neural network during inference to generate an inference output; to correlate the first activation profile against activation profiles associated with the first subset of training samples; to determine that the first subset of training samples is associated with the event based on correlation; and to output an indicator to the presentation device to identify the first subset of training samples as being associated with the event. In Example 47, the system of Example 46, the logic circuitry to partition the training data based on one or more contextual dimensions associated with the event to identify multiple subsets of training samples in the training data including the first subset, each of the training samples to be associated with a set of one or more contextual dimensions. In Example 48, the system of Example 47, the logic circuitry to determine the first subset of training samples by clustering the training data based on characteristics associated with the training data with a locality sensitive hashing (LSH), the characteristics associated with indicators to indicate an activation intensity associated with the contextual dimensions. In Example 49, the system of Example 48, the logic circuitry to determine the first subset of training samples by clustering the training data with a locality sensitive hashing (LSH) based on a combination of the characteristics and activation vectors of the first subset of training samples. In Example 50, the system of Example 47, the logic circuitry to determine the first subset of training samples by clustering the training data based on activation vectors of the first subset of training samples with a locality sensitive hashing (LSH). In Example 51, the system of Example 46, wherein determination of the first activation profile associated with the event comprises capture of characteristics associated with the event, the characteristics to comprise values associated with contextual dimensions. In Example 52, the system of Example 46, wherein the correlation comprises comparison of the first activation profile with multiple subsets of training samples in the training data to associate the first activation profile with one subset of the multiple subsets of training samples in the training data based on characteristics associated with the event, an activation vector associated with the event, or a combination of the characteristics and the activation vector associated with the event. In Example 53, the system of Example 46, wherein the correlation comprises tracing of the first activation profile back to one subset of multiple subsets of training samples in the training data based on characteristics associated with the event, an activation vector associated with the event, or a combination of the characteristics and the activation vector associated with the event. In Example 54, the system of Example 46, the event to be a situation for which the neural network makes a decision or generates an inference output, the event to be represented by an instance of input data or a series of input data provided to the neural network. In Example 55, the system of Example 46, the logic circuitry to cluster the training samples based on a hierarchy of contextual dimensions. In Example 56, the system of Example 46, the logic circuitry to cluster the training samples based on activation vectors associated with the training samples. In Example 57, the system of Example 46, the logic circuitry to identify a scoring matrix for the first subset of the training samples based on the first activation profile for a field sample associated with the event. In Example 58, the system of Example 46, the first activation profile to comprise characteristics associated with the event, an activation vector associated with the event, or a combination of the characteristics and the activation vector associated with the event. In Example 59, the system of Example 46, the logic circuitry to comprise a trusted execution environment to gather training samples from different models. In Example 60, the system of Example 46, the logic circuitry to comprise a trusted execution environment to communicate with remote devices to receive training samples through crowd-sourcing.

What is claimed is:

1. An apparatus, the apparatus comprising:
memory; and
logic circuitry to:
determine a first activation profile associated with an event, the first activation profile based on activation of nodes in one or more layers of a neural network during inference to generate an inference output;
correlate the first activation profile against a second activation profile associated with a first training sample of training data, wherein the correlation comprises comparison of the first activation profile with multiple subsets of training samples in the training data;
determine that the first training sample is associated with the event based on correlation; and
output an indicator to identify the first training sample as being associated with the event; and
graphics circuitry to generate a user interface to display a representation of the first training sample and a representation of a field sample for the event.

2. The apparatus of claim 1, the logic circuitry to partition the training data based on one or more contextual dimensions associated with the event to identify multiple subsets of training samples in the training data, each of the training samples to be associated with a set of one or more contextual dimensions.

3. The apparatus of claim 2, the logic circuitry to determine a first subset of training samples by clustering the training data based on characteristics associated with the training data with a locality sensitive hashing (LSH), the characteristics associated with indicators to indicate an activation intensity associated with the contextual dimensions.

4. The apparatus of claim 3, the logic circuitry to determine the first subset of training samples by clustering the training data with a locality sensitive hashing (LSH) based on a combination of the characteristics and activation vectors of the first subset of training samples.

5. The apparatus of claim 2, the logic circuitry to determine a first subset of training samples by clustering the training data based on activation vectors of the first subset of training samples with a locality sensitive hashing (LSH).

6. The apparatus of claim 1, wherein determination of the first activation profile associated with the event comprises capture of characteristics associated with the event, the characteristics to comprise values associated with contextual dimensions.

7. The apparatus of claim 1, wherein the correlation comprises comparison of the first activation profile with multiple subsets of training samples in the training data to associate the first activation profile with one subset of the multiple subsets of training samples in the training data based on characteristics associated with the event, an activation vector associated with the event, or a combination of the characteristics and the activation vector associated with the event.

8. The apparatus of claim 1, the logic circuitry to cluster the training samples based on a hierarchy of contextual dimensions.

9. The apparatus of claim 1, the logic circuitry to cluster the training samples based on activation vectors associated with the training samples.

10. The apparatus of claim 1, the logic circuitry to identify a scoring matrix for a first subset of training samples based on the first activation profile for a field sample based on the event.

11. The apparatus of claim 1, the first activation profile to comprise characteristics associated with the event, an activation vector associated with the event, or a combination of the characteristics and the activation vector associated with the event.

12. The apparatus of claim 1, the logic circuitry to comprise a trusted execution environment to gather training samples from different models.

13. The apparatus of claim 1, the logic circuitry to comprise a trusted execution environment to communicate with remote devices to receive training samples through crowdsourcing.

14. A method, the method comprising:
receiving, by logic circuitry, a first activation profile associated with an event, the first activation profile to comprise an auxiliary output from a neural network based on activation of nodes in one or more layers of the neural network during inference to generate an inference output;
correlating, by logic circuitry, the first activation profile against a second activation profile associated with a first training sample of training data, wherein the correlation comprises comparison of the first activation profile with multiple subsets of training samples in the training data;
determining, by logic circuitry, that the first training sample is associated with the event based on the correlating;
outputting, by logic circuitry, an indicator to identify the first training sample as being associated with the event; and
generating, by graphics circuitry, a user interface to display a representation of the first training sample and a representation of a field sample for the event.

15. The method of claim 14, further comprising partitioning the training data based on one or more contextual dimensions associated with the event to identify multiple subsets of training samples in the training data, each of the training samples to be associated with a set of one or more contextual dimensions.

16. The method of claim 15, further comprising identifying a first subset of training samples by clustering the training data based on characteristics associated with the training data with a locality sensitive hashing (LSH), the characteristics associated with indicators to indicate an activation intensity associated with the contextual dimensions.

17. The method of claim 14, further comprising identifying a scoring matrix for a subset of training samples based on the first activation profile for a field sample based on the event, the event to be a situation for which the neural network makes a decision or generates an inference output, the event to be represented by an instance of input data or a series of input data provided to the neural network.

18. A computer program product comprising a non-transitory computer-readable medium, comprising instructions, which when executed by a processor cause the processor to perform operations, the operations to:

access memory to determine a first activation profile associated with an event, the first activation profile based on activation of nodes in one or more layers of a neural network during inference to generate an inference output;

correlate the first activation profile against a second activation profile associated with a first training sample of training data, wherein the correlation comprises comparison of the first activation profile with multiple subsets of training samples in the training data;

determine that the first training sample is associated with the event based on correlation;

output an indicator to identify the first training sample as being associated with the event; and generate a user interface to display a representation of the first training sample and a representation of a field sample for the event.

19. The computer program product of claim 18, wherein the operations further comprise operations to partition the training data based on one or more contextual dimensions associated with the event to identify multiple subsets of training samples in the training data, each of the training samples to be associated with a set of one or more contextual dimensions.

20. The computer program product of claim 18, wherein the correlation comprises tracing of the first activation profile back to one subset of multiple subsets of training samples in the training data based on characteristics associated with the event, an activation vector associated with the event, or a combination of the characteristics and the activation vector associated with the event.

21. The computer program product of claim 18, wherein the operations further comprise operations to cluster the training samples based on a hierarchy of contextual dimensions or based on activation vectors associated with the training samples.

22. A system, the system comprising:

a presentation device comprising processor circuitry and a display, the processor circuitry to select at least a first subset of training samples of training data to present to a user and the display to display a representation of the first subset of training samples and a representation of a field sample for an event; and logic circuitry coupled with the processor circuitry of the presentation device to:

determine a first activation profile associated with the event, the first activation profile based on activation of nodes in one or more layers of a neural network during inference to generate an inference output;

correlate the first activation profile against activation profiles associated with the first subset of training samples, wherein the correlation comprises comparison of the first activation profile with multiple subsets of training samples in the training data;

determine that the first subset of training samples is associated with the event based on correlation; and output an indicator to the presentation device to identify the first subset of training samples as being associated with the event.

23. The system of claim 22, the logic circuitry to partition the training data based on one or more contextual dimensions associated with the event to identify multiple subsets of training samples in the training data including the first subset, each of the training samples to be associated with a set of one or more contextual dimensions.

24. The system of claim 23, the logic circuitry to determine the first subset of training samples by clustering the training data based on characteristics associated with the training data with a locality sensitive hashing (LSH), the characteristics associated with indicators to indicate an activation intensity associated with the contextual dimensions.

25. The system of claim 24, the logic circuitry to determine the first subset of training samples by clustering the training data with a locality sensitive hashing (LSH) based on a combination of the characteristics and activation vectors of the first subset of training samples.

\* \* \* \* \*